(12) United States Patent
Stroh

(10) Patent No.: US 8,554,660 B2
(45) Date of Patent: Oct. 8, 2013

(54) PAYMENT METHOD EMPLOYING A BILL OF EXCHANGE

(75) Inventor: Leslie Stroh, New Lisbon, NY (US)

(73) Assignee: Trade Finance Service Corporation, New York, NY (US)

(*) Notice: Subject to any disclaimer, the term of this patent is extended or adjusted under 35 U.S.C. 154(b) by 978 days.

(21) Appl. No.: 11/613,348

(22) Filed: Dec. 20, 2006

(65) Prior Publication Data
US 2007/0100711 A1  May 3, 2007

Related U.S. Application Data

(63) Continuation of application No. 09/264,171, filed on Mar. 5, 1999, now Pat. No. 7,155,409.

(51) Int. Cl.
*G06Q 40/00* (2012.01)
*G06Q 10/08* (2012.01)
*G06Q 30/04* (2012.01)
*G06Q 40/02* (2012.01)
*G06Q 40/08* (2012.01)

(52) U.S. Cl.
CPC ........... *G06Q 40/00* (2013.01); *G06Q 10/087* (2013.01); *G06Q 30/04* (2013.01); *G06Q 40/02* (2013.01); *G06Q 40/08* (2013.01)
USPC .................................. 705/37; 705/35; 705/38

(58) Field of Classification Search
CPC ..... G06Q 10/087; G06Q 30/03; G06Q 40/04; G06Q 40/02; G06Q 40/08; G06Q 40/00
USPC ............... 705/35, 36, 36 R, 37, 38, 57
See application file for complete search history.

(56) References Cited

U.S. PATENT DOCUMENTS

| | | | | |
|---|---|---|---|---|
| 5,873,072 A | * | 2/1999 | Kight et al. | 705/40 |
| 6,772,131 B1 | * | 8/2004 | Francis et al. | 705/35 |
| 2002/0069174 A1 | * | 6/2002 | Fox et al. | 705/52 |
| 2005/0075964 A1 | * | 4/2005 | Quinn et al. | 705/37 |

OTHER PUBLICATIONS

UNZ & Co.; "A Basic Guide to E G-1998 Edition"; 1998; Chapters 12 and 13.*
G. J. Davies; "The Role of Exporter and Freight Forwarder in the United Kingdom"; JSTOR; Journal of Internationa Business Studies; vol. 12, No. 3; Winter 1981; pp. 99-108.*

(Continued)

*Primary Examiner* — Ella Colbert
(74) *Attorney, Agent, or Firm* — K&L Gates LLP

(57) ABSTRACT

A method of paying for a product is traded from a seller to a buyer, wherein a bill of exchange is issued by the seller and accepted by the buyer. The bill of exchange can be payable at a certain future date to the order of the seller at a first financial institution and drawn on the buyer at a second financial institution and becomes a negotiable instrument at the certain future date without reference to the transaction. The method can include: originating the bill of exchange from an originator who is not the seller; signing of the bill of exchange by the buyer then the seller and the seller then issuing of the bill of exchange. The method can also include negotiating the bill of exchange after issuance and on or after the certain future date to effect payment. The bill of exchange can be issued and accepted before a triggering event.

17 Claims, 18 Drawing Sheets

(56) References Cited

OTHER PUBLICATIONS

Wilson, Hoyet Wright, Phd.; "The Banker's Acceptance: An Examination and Analysis of The Instrument and Market"; 1980: pp. 1-2.*

Jeff Madura; "International Financial Management 5TH Edition"; 1998; pp. 397-417 plus Front page and publication page.*

Lam, Arno F.; "Credit Management and Shared Service Centers"; Mar. 2000; pp. 1-10.*

Herbst, Frederick C, Jr.; "Chrysler Corporation Balancing global expansion and international risk"; Nov./Dec. 1997; pp. 1-4.*

White, Brian; "Signpost: pain or payment—the truth behind letters of credit: part 2"; May 1990; pp. 1-2.*

\* cited by examiner

| Exchange for US$: | | 19____ |
|---|---|---|
| PROFORMA # <br> CIC CONTROL # <br> INVOICE # <br> SHIPMENT # <br> ITN # <br> EXPORTER ID # <br> BOE 1 / BOE 2 | At: SIXTY DAYS AFTER EVENT (DATE) ____ of this FIRST of Exchange (Second Unpaid) pay to the order of <br> AAB COLLECTING BANK <br> USD | |
| IMPORTER ID: <br> ACCEPTED IMPORTER <br> DATE | Value received and charge the same to the account of <br> To _____ <br> IMPORTER <br> No. | EXPORTER |

© 1999 Leslie Stroh (17 U.S.C. 401)

Figure 11A

| Exchange for US$: | | 19____ |
|---|---|---|
| EXPORTER ID # <br> PERFOMA # <br> CIC CONTROL # <br> INVOICE # <br> SHIPMENT # <br> ITN # <br> BOE 1 / BOE 2 <br> IMPORTER ID # | At: SIXTY DAYS AFTER EVENT (DATE) ____ of this SECOND of Exchange (First Unpaid) pay to the order of <br> AAB COLLECTING BANK <br> USD | |
| IMPORTER ID: <br> ACCEPTED IMPORTER <br> DATE | Value received and charge the same to the account of <br> To _____ <br> IMPORTER <br> No. | EXPORTER |

© 1999 Leslie Stroh (17 U.S.C. 401)

Figure 11B

PRO-FORMA INVOICE COVER SHEET

EXPORTER INFORMATION

TERMS OF SALE

IMPORTER INFORMATION

SHIP TO:

PROFORMA INVOICE SUMMARY INFO.

BANK OF PRESENTATIION (IMPORTER'S BANK) INFO.

CARRIAGE INSURER INFO

IMPORT CERTIFICATIONS

IMPORT DOCUMENTS REQUIRED

PRO-FORMA INVOICE ITEMIZATION

Please read, accept, sign and date the following items:

MERCHANDISE CLAIMS          ACCEPTED:          DATE:

TRANSPORTATION          ACCEPTED:          DATE:

POWER OF ATTORNEY          ACCEPTED:          DATE:

CHANGE ORDERS          ACCEPTED:          DATE:

1ST BILL OF EXCHANGE          ACCEPTED:          DATE:

PAYMENT METHOD EMPLOYING A BILL OF EXCHANGE

CROSS-REFERENCE TO A RELATED APPLICATION

This application is a continuation of application Ser. No. 09/264,171 filed Mar. 5, 1999, U.S. Pat. No. 7,155,409 dated Dec. 26, 2006, the entire disclosure of which is incorporated by reference herein.

BACKGROUND OF THE INVENTION

1. Field of the Invention

The present invention relates to a method of trade financing, which is particularly, but not exclusively, suitable for use in financing international trade between a buyer and a seller resident in different countries, and to computerized systems for implementing the method. The invention further relates to novel trade instruments, to a novel method of managing and monitoring an international trade transaction and can provide novel institutional relationships between commercial, financial, industrial and even government institutions, all of which are useful for enabling or facilitating domestic or international trade transactions.

2. Description of Related Art Including Information Disclosed under 37 CFR 1.97 and 37 CFR 1.98

There is often difficulty in obtaining efficient and timely execution of international trade transactions. One difficulty encountered in trading between many buyers and sellers, namely those lacking the advantages of a trusting relationship built from years of past experience with one another, is that the seller is at risk to the buyer's willingness and ability to pay. This problem is magnified in international trade by legal, jurisdictional, linguistic, cultural and other differences, particularly since by definition, international trade is trade between two separate and distinct legal jurisdictions, and often two separate and distinct legal traditions. Unlike a simple store purchase where release of the goods to a customer not previously known and trusted by the seller, is contingent upon receipt by the seller of payment, or of a highly credible credit card order for payment, in international trade, unless prepayment is received, (an implausible practice on most save the smallest transactions), the seller is necessarily exposed to unknown shortcomings in the buyer's integrity or resources, by the need to ship goods or, possibly, supply services, before payment is received. The goods or services supplied or goods and services supplied in a trade transaction are referenced herein as the "traded product".

Some desirable goals for an improved method of trade financing are as follows:
1. that the seller be fully reimbursed promptly after shipping or otherwise releasing the traded product;
2. that the seller not be exposed to possible unwillingness of the buyer to pay after such release of the traded product from the control of the seller;
3. that the seller receive a negotiable financial instrument enabling such prompt reimbursement which instrument is not subject to recourse by the buyer in the case of merchandise disputes;
4. that the financial instrument be one that lends itself to credit enhancement features providing improved assurance of the buyer's ability to pay; and
5. that permits creditworthy buyers time to pay.

Various methods are of course known to the art for financing international trade, and some of them, such as letters of credit, have been used for centuries.

A typical open receivable trade financing method is depicted in FIG. 1 and commences, in step 1, with receipt by seller S of the buyer's purchase order specifying the goods to shipped, prices, method of carriage and so on. Then the seller ships the goods, step 2 and mails one or more invoices to buyer B, perhaps following up with a statement, to request payment from buyer B, step 3.

At some unknown subsequent time, buyer B then remits payment to seller S, step 4, unless in the interim buyer B has decided that he is unwilling to pay for the goods. Seller S is completely dependent upon buyer B's reputation for creditworthiness and is exposed to unwillingness of the buyert to pay, inability of the buyer to pay, untimeliness of payment, and to the possibility that buyer B may seek recourse for any one of a number of commercial complaints, for example, shortages, quality complaints, substitutions incorrect items and so on.

In some instances, seller S may be able to insure, or obtain an advance against a pool of their receivables. Insurance usually is effected by obtaining approval from an insuring entity prior to shipment of a pool of invoices addressed to a number of buyers. With the approval in hand the seller ships the goods and collects a discounted advance payment from the funding bank. At some point in the future when the receivables are collected the seller repays the advance to the funding bank. Liability for uncollected invoices is determined in the advance agreement as between the insuring entity and the seller.

A useful variation of accounts receiveable financing includes factoring. Referring to FIG. 1B, in receivables factoring the seller assigns the invoice, passing title therein, to a factor, F1, step 5. At the same time seller S, notifies buyer B of the assignment and instructs buyer B to send his payment to factor F1. In step 6 factor F1 advances a partial payment on the invoice to seller S. In step 7, factor F1, standing in the place of seller S, collects the invoice receivable from buyer B. The balance less the factor's discount or commission is paid to seller S, in step 8.

Clearly, the advantage of factoring for seller S is in step 6 where seller S receives an advance on the invoice. The drawbacks are essentially the same as the drawbacks of open receivables financing. Additionally the seller runs the risk of having to return the advance to the factor in the event the invoice becomes uncollectible.

Referring now to the letter of credit procedure shown schematically in FIG. 2, the process commences with exporter seller S and importer buyer B agreeing upon a purchase that will be financed by a letter of credit, "L/C" in the drawing figure, step 1. Buyer B requests buyer B's local bank to initiate a letter of credit, step 2. Typically, as shown in step 3 the letter of credit is now forwarded to chain of banks, acting as agents in succession for bank F1. The chain can comprise, for example: F1's correspondent bank F2 in the importer's country; F2's counterpart correspondent bank in the exporter's country F3; and F3's counterpart bank F4, local to exporter seller S. Bank F4 notifies seller S of the receipt of the letter of credit.

When so advised, seller S ships the goods to the order of bank F1, step 4. In step 5, seller S forwards the shipping documents to bank F4 and draws a draft on bank F1. Seller S then submits documents for negotiation to bank F4 who scrutinizes them for inconsistencies and inaccuracies, and for compliance with regulations such as UCP500.

It is in the nature of the letter of credit process, which is rife with administrative detail, that 80 percent of the time, bank F4 rejects the documents, usually for minor reasons, called discrepancies. The remaining 20 percent are accepted in the, step 6. In step 7 seller S resubmits corrected versions of any rejected draft and documents.

Once the documents are approved bank F4 pays the face value of the letter of credit, less charges, to seller S, step 8. Bank F4 releases the documents to bank F1 than, step 9 and receives reimbursement, step 10. Bank F1, in turn, and releases the documents to buyer B, and obtains payment, step 11, enabling buyer B to obtain the goods, and clear them through customs.

The letter of credit process provides a high degree of security for seller S who is essentially only at risk to the banking system. The problems with a letter of credit are its complexity leading to errors and inconveniences, and the fact that it is singularly unattractive to many buyers. In many cases buyer B will have to deposit cash or cash-equivalent collateral with bank F1 to obtain issuance of a letter of credit, meaning that buyer B effectively funds the transaction for a significant period of time to receipt of the goods. Where the transaction has significant value the requirement for letter of credit collateral may be a significant constraint on buyer B's liquidity. Rather than receiving time to pay, buyer B effectively has to pay in advance. The letter of credit process is complex, time-consuming, error-prone and subject to delays, and expensive particularly for smaller transactions.

The forfaiting process illustrated in FIG. 3, as an example of forfaiting, takes place between an exporter-seller S, an importer-buyer B, a forfait house FH, an avalizor A, an optional holder in due course H and the buyer's bank BB. Forfaiting is usually for a multi-year term. Thus, in step 1 seller S and buyer B agree, on a multi-year purchase agreement. Typically, the agreement will provide for quarterly or semi-annual payments, to be effected by avalized drafts which the seller can cash at forfait house FH.

In step 2, forfait house FH calculates the individual amounts of the payments making allowance for interest, and fees applicable to the at risk party or parties, namely forfait house FH and avalizor A.

In step 3, seller S draws a series of stand-alone drafts, each for a fixed amount as calculated by finance house FH in step 2, and forwards the drafts to buyer B for acceptance. The amounts may be equal amounts or may vary during the life of the agreement. The drafts are not partial payments but each represents the extent of the purchasing power extended to buyer B during the respective quarter or half-year period covered by the draft.

In step 4 buyer B accepts all the drafts in the series as individual stand-alone documents, without reference to the underlying transaction, and returns the accepted drafts to seller S.

In step 5 seller S has each draft avalized by avalizor A who endorses each with the phrase "por aval", thereby guaranteeing payment if buyer B defaults. Being now in possession of the avalized drafts which are negotiable with forfait house FH, seller S ships goods, step 6, as provided in the purchase program agreed in step 1.

In step 7, the complete series of avalized drafts is sold to forfait house FH at a discount. Optionally, step 8, forfait house FH may sell the avalized drafts to a holder in due course, in which case forfait house FH endorses the back of each draft to holder H.

In step 9, forfait house FH, or holder H, presents the avalized draft for payment, on the due date, to buyer's bank BB, and receives payment for all honored drafts. In step 10, forfait house FH, or holder H, presents each dishonored draft for payment to avalizor A under the aval.

In such a forfaiting process, seller S has little exposure being at risk only to recognized financial institutions that provide the functions of forfait house FH and avalizor A. Also, buyer B receives credit. However, the process is expensive requiring significant discounts to engage the participation of both forfait house FH and avalizor A. Also, forfaiting is a long-term, complex process not suited to financing smaller, individual import-export transactions. Typically, forfaiting is used to finance multiple payments for long term large capital goods purchases to more closely match the payment cycle to the financial returns earned by the underlying capital equipment. It is typically applied to three to seven-year terms for transactions valued in the millions of dollars. As with a letter of credit, buyer B may have to furnish collateral to avalizor A, adversely affecting buyer B's liquidity. Furthermore, forfaiting is a specialist activity requiring forfait house FH and avalizor A to enter into a multi-year commitment to buyer B whose fortunes change over the years. Forfaiting is therefore not suitable for many buyers who may be quite creditworthy for the duration of a single transaction, but are not sufficiently established and durable to justify long-term confidence.

The patent literature contains some proposals for new financing or trading methods and systems. For example, Potter et al U.S. Pat. No. 5,787,402 teaches a method for automating foreign currency transactions; Custy U.S. Pat. No. 5,774,879 teaches a method for automated financial instrument processing, and Harris et al. in U.S. Pat. No. 5,517,406 teaches a trade processing system for mutual fund transaction requests. None of these prior proposals is remotely relevant to applicant's objectives.

Tozzoli et al. in U.S. Pat. No. 5,717,989 teach a method of facilitating international trade in goods, which method avoids the use of a letter of credit, and the presentation and manual processing of documentation for compliance therewith. However, Tozzoli's lacks teaching regarding the use of a new payment instrument to finance international trade, and does not employ bills of exchange. Tozzoli's system addresses problems that arise from documentary discrepancies in trade transactions and seeks reduction of the delays and costs involved in financing trade by automated comparison of purchase order data, contract data and shipment data to generate payment due data (see claim 1). Tozzoli does not appear to provide any new trade financing method or instrument which helps solve the problem of financing a buyer while reducing the seller's exposure to risk after release of the product being traded.

U.S. Pat. No. 5,694,552 recently issued to Aharoni discloses a financing method and employing what is described as a new use of at least one trade acceptance draft. Aharoni's method is a buyer-oriented method which contemplates that buyer will pay for goods and/or services received from seller S with one or more buyout-executed in trade acceptance drafts. Subject to various conditions, these drafts are negotiated by seller S with a financial organisation FO. Referring to the block flow diagram of FIGS. 4A-4B, Aharoni's method commences in step 1 with seller S and financial organisation FO concluding a draft acceptance agreement defining the terms under which financial organisation FO will purchase accepted drafts from seller S, see column 2, lines 40-55. The drafts are to be purchased after shipment of goods or delivery of services (only "goods" will be referenced hereinafter, it being understood that services and may be alternatively or additionally intended). The agreement is generic in that no specific buyer is contemplated. Thus, there can be no approval of a specific buyer's credit before the agreement is concluded.

In step 2, after soliciting a willing buyer B, Aharoni concludes a purchase agreement with the buyer B, called a "TAD Program Agreement", in which buyer B agrees to pay for the goods with one or more buyer-accepted trade drafts, see column 2, lines 59-64. Buyer B now sends seller S a purchase order, step 3, see column 3, lines 37-38 and column 4, lines 51-52. Because buyer B's credit has not yet been checked, seller S has to request pre-approval from financial organisation FO of the proposed sale defined by the purchase order, step 4, see column 3, lines 39-42 and column 4, lines 53-54. If financial organisation FO denies approval, the transaction is aborted, step 5, see column 3, lines 45-46.

In step 6, financial organisation FO pre-approves the proposed transaction, see column 3, lines 43-45 and column 4, line 55, enabling seller S to ship the goods, step 7. In step 7, in addition to shipping the goods to buyer B, seller S also sends buyer B one or more trade acceptance drafts to be used for payment, see column 3, lines 47-53, and column 4, line 56. In step 8 if buyer B does not accept the goods or does not sign the draft or drafts, financing is aborted and seller S must have recourse to the purchase agreement to obtain payment directly from buyer B, see column 3, lines 57-61.

In step 9, buyer B accepts the goods and then subsequently confirms its acceptance by signing the drafts and returning them to seller S, see column 3, lines 54-55 and column 4, lines 57-58. Seller S endorses each draft on the back of the document and tenders it to financial organisation FO for purchase, step 10, see column 3, lines 62-65 and column 4, line 60. Financial organisation FO then checks buyer B's credit for changes since step 6, and if an adverse report is received, declines to purchase the drafts, step 11, see column 3, lines 66-67. Once again, in this eventuality, seller S must resort to direct dealings with an unwilling or unable buyer, in order to obtain payment.

In step 12, if a favorable report is received, financial organisation FO pays seller S an advance on the draft or drafts, not the full value of the drafts see column 4, lines 1-5, and column 4, lines 61-64. Where seller S has gone to the expense of obtaining credit insurance, financial organisation FO pays the balance to seller S, in step 13 see column 4, lines 5-8. Otherwise seller S must wait until financial organisation FO requests payment from the buyer bank BB, step 14, see column 4, lines 9-12 and column 4, line 67 to column 5, line 3-58. and receives that payment before the balance is paid, step 15, see column 4, line 17, and column 5, line 4. In step 16, if financial organisation FO is not paid, seller S has to return the advance received in step 12, see column 4 lines 27-33.

The problem with Aharoni is that, after shipping the goods, seller S is repeatedly at risk to buyer B's unwillingness or inability to pay. Thus: in step 8, if buyer does not accept the goods or sign the drafts, finance is aborted; in step 11 if an adverse credit report is received, financial organisation FO will not purchase the drafts; and in step 16, if financial organisation FO cannot collect from buyer's bank, the advance must be returned. Accordingly, seller S may suffer the cost of returned goods, and a lost order, or the burden of an unfinanced transaction with a high probability of a delayed or incomplete payment.

There is thus a need for a new method of trade financing which provides for the seller to be fully reimbursed promptly after releasing or delivering the traded product, which avoids exposing the seller to unwillingness of the buyer to pay for the released product and which permits creditworthy buyers to have time to pay. There is also a need for new and simple financing instruments which can facilitate attainment of these desirable objectives, sor computer implementable systems and methods for enhancing the trade financing process and for taking advantage of the benefits of Internet implementation.

BRIEF SUMMARY OF THE INVENTION

The present invention solves a problem. It solves the problem of providing a trade finance method wherein a seller receives a negotiable financial instrument in payment for a traded product, promptly after release of the traded product from the seller's control, allows the buyer time to pay and yet is not exposed to the possibility that the buyer becomes unwilling to pay after the traded product has been released from the seller's control. Preferred embodiments of the invention also solve, mitigate or help manage, problems that may arise from a willing buyer's inability to pay.

In one aspect, the invention solves this problem by providing a trade finance method for financing the sale of a traded product wherein, prior to supply of the traded product by the seller, the buyer provides to the seller or the seller's agent, a buyer-executed payment draft ordering payment, in the amount of the value of the traded product, to be made at a future date triggered by a future event. The future event is, for example an event related to release of the product from the seller's control, for example, the date of supply of the traded product. It could however be a buyer-related event, for example availability of certain funds to the buyer, perhaps the proceeds from an asset sale.

The payment draft is thus a prerelease payment draft, issued prior to release of the product by the seller or prior to such other triggering event as may be determined or agreed by the seller or buyer. Yet the payment draft is not a pre-payment. For one reason it is not immediately negotiable, because it is a latent draft which is for the moment inactive, becoming active when the triggering event occurs. Unlike a conventional pre-payment where the seller can obtain the proceeds before shipment, with the inventive method, if the seller does not cause the triggering event to occur, (assuming the event to be seller-controlled, which is preferred but not essential) the prerelease payment draft is not activated and cannot be cashed or otherwise negotiated. Unlike a post-dated check, whose date may pass before the event occurs, the event-triggered draft employed in the invention does not put the buyer at risk.

Furthermore, under most accounting standards, the pre-release payment draft is neither an asset nor a liability to be reported on their balance sheet, either for the seller or the buyer. Thus the inventive method has the additional advantage of providing off-balance-sheet financing.

For these and other reasons, the method of the invention, employing as it does a novel instrument, a prerelease, event-triggered, payment draft, is attractive to the buyer. Because the draft, executed or accepted by the buyer, evidences the buyer's willingness to pay, is under the seller's control, being in possession of the seller or their agent, and can become activated, as a legal obligation, when the seller releases the product, the method is also attractive to the seller who is thus protected from the risk that the buyer will decide not to pay. Time for the buyer to pay can be provided by giving the prerelease payment draft a tenor or maturity at a date certain calculated as a fixed term running from the triggering event.

Preferred embodiments of the invention comprise methods of conducting export and import trade transactions employing a pre-release draft. The methods can be exporter-controlled or importer-controlled, depending upon the capabilities and wishes of the parties to the transaction.

Further preferred embodiments of the invention provide for pre-approved conversion of the pre-release buyer-accepted trade draft to a banker's draft, for use of a second of exchange mutually extinguishable with the pre-release payment draft to facilitate the payment process and enhance the collateralization of the transaction, and for use of an enhanced pro-forma invoice or enhanced purchase order setting forth relevant agreement terms which also facilitate the transaction. Preferred such terms provide for removal of trade disputes from the payment cycle and agreement to use the pre-release payment draft of the invention for payment for the traded product. Preferably, the pro-forma invoice or purchase order, enhanced with such terms, is executed by the buyer and received by the seller prior to the transaction triggering event.

The novel methods and instruments of the invention provide a beneficial trade financing process which is flexible and valuable for both large and small, domestic or international transactions, providing simplification, control and enhancement of the financing, payment and documentation processes traditionally involved in commercial trade transactions.

The benefits of the invention can be especially helpful in simplifying the paperwork and reducing the costs of small export or import transactions and may make smaller export or import transactions more feasible than they have been in the past, especially for an exporter or importer wishing to conduct a number of such relatively small transactions.

In a further aspect, the invention provides novel financial instruments that are useful in practicing the novel trade financing methods described herein, as will be made apparent hereinbelow. Still further aspects of the invention provide computer-implementable methods of managing and monitoring a trade finance process in a manner suitable for administration by a third party administrator, and also provide computer software and systems for implementing the methods disclosed herein. Such methods include the use of distributed workflow management software to coordinate software procedures for implementing the invention with the requirements of preexisting treaties, and their successors, and industry practice, in a manner consistent with the business agreements between the buyer and the seller and with their business objectives.

BRIEF DESCRIPTION OF THE SEVERAL VIEWS OF THE DRAWING

One or more embodiments of the invention and of making and using the invention, as well as the best mode contemplated of carrying out the invention, are described in detail below, by way of example, with reference to the accompanying drawings, in which:

FIG. 11A illustrates an example of a first of exchange document useful in the practice of the invention;

FIG. 11B illustrates an example of a second of exchange document useful in the practice of the invention;

FIG. 11C illustrates an example of a pro-forma invoice document useful in the practice of the invention;

FIG. 17 is an illustration of a computer screen displaying a module of a document image work flow management system according to the invention.

DETAILED DESCRIPTION OF THE INVENTION

Figure 1A:
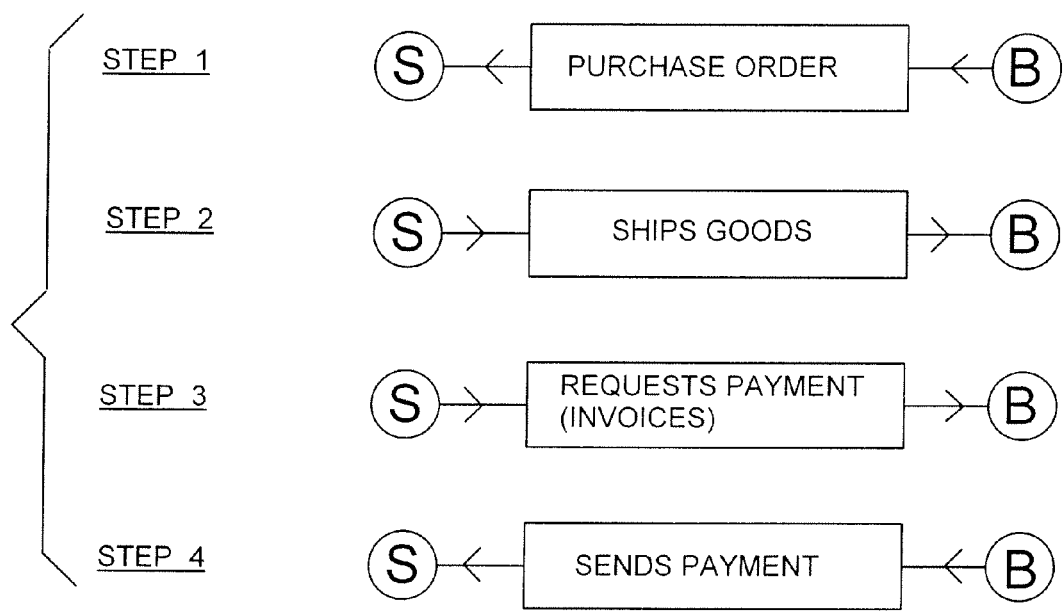
FIG. 1A is a block flow diagram of one prior art method of international trade financing which method employs open receivables financing.
Figure 1B:
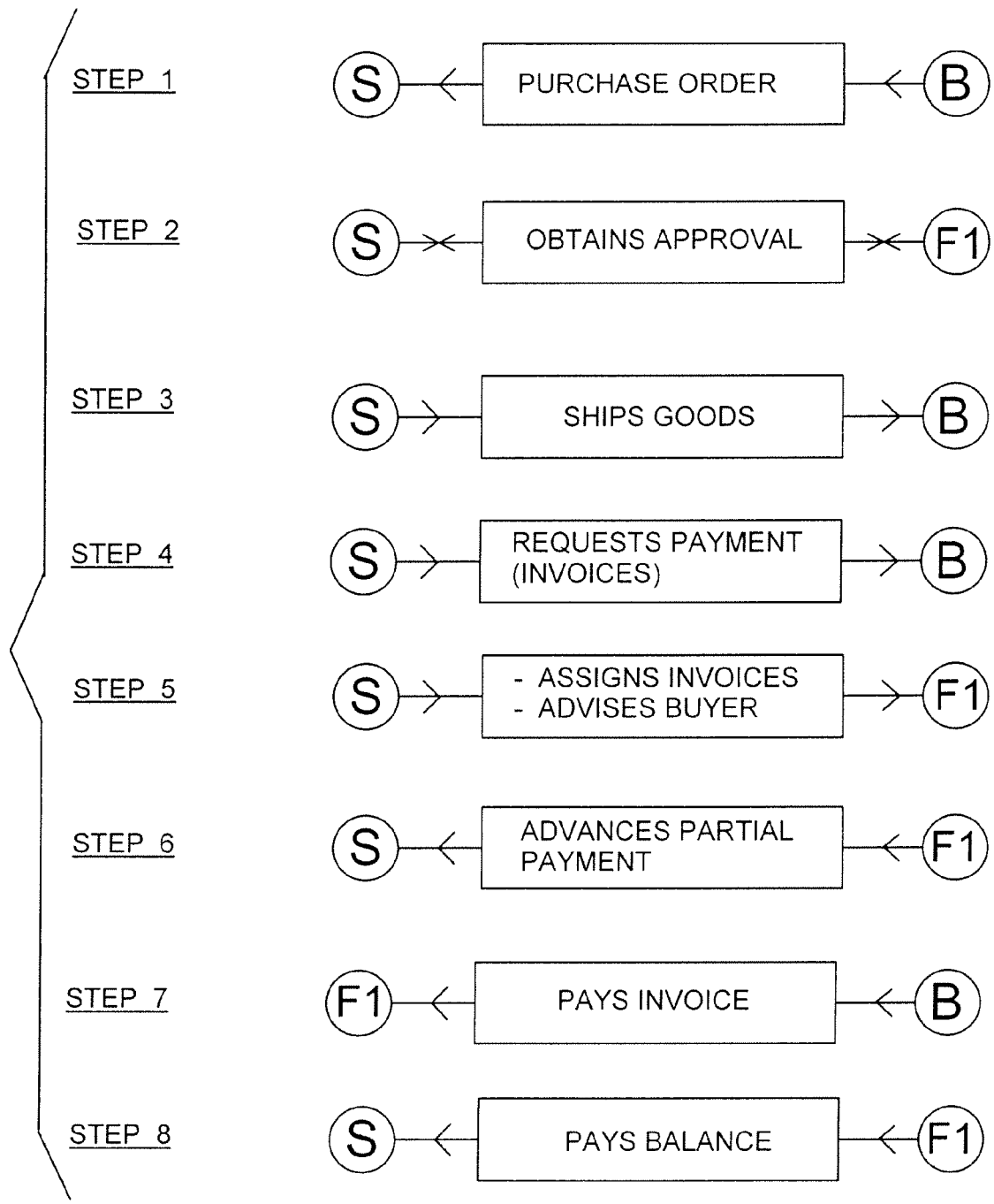
FIG. 1B is a block flow diagram of another prior art method of international trade financing which method employs factoring.
Figure 2:
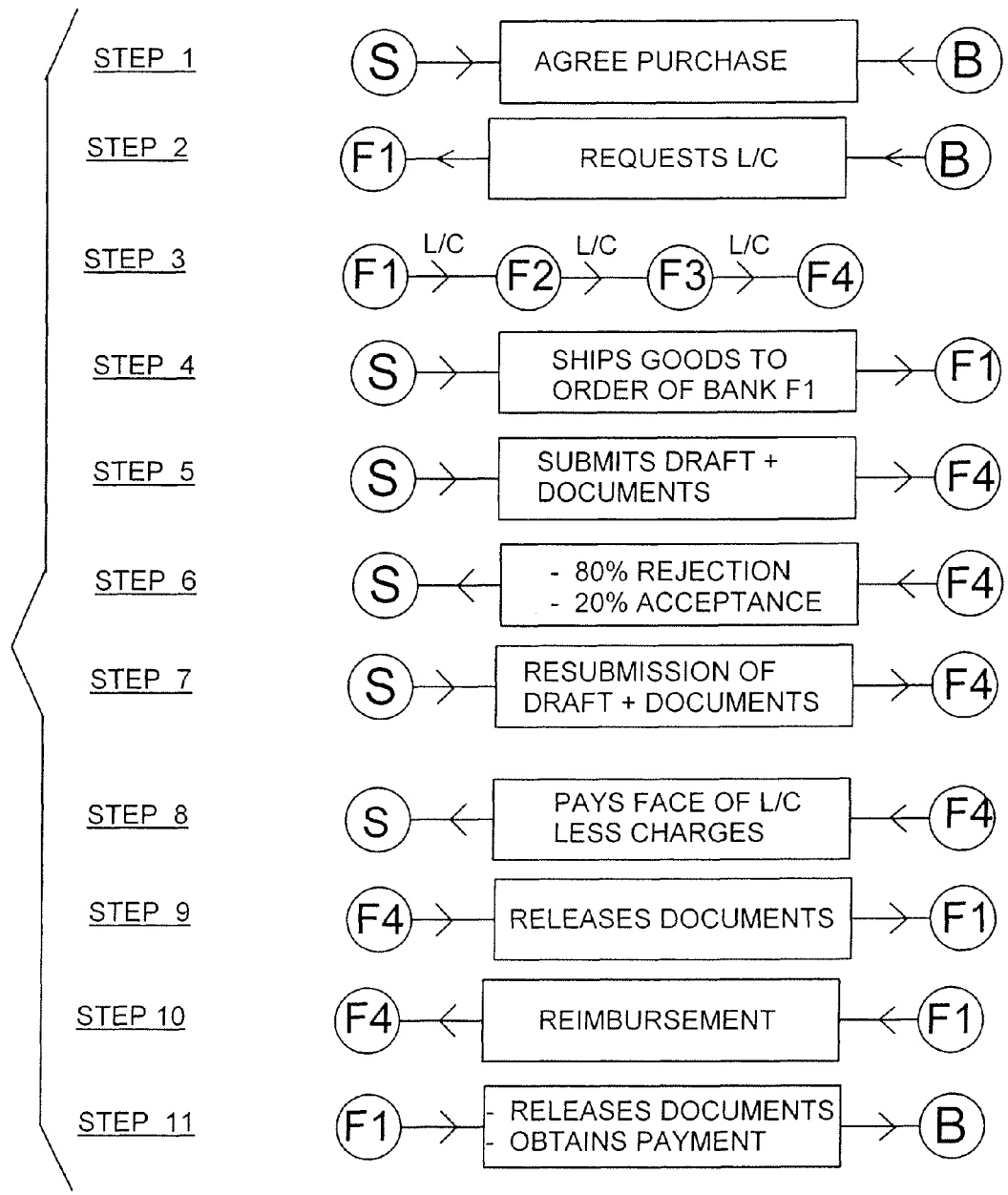
FIG. 2 is a block flow diagram of another prior art method of international trade financing which method employs letter of credit financing.
Figure 3:
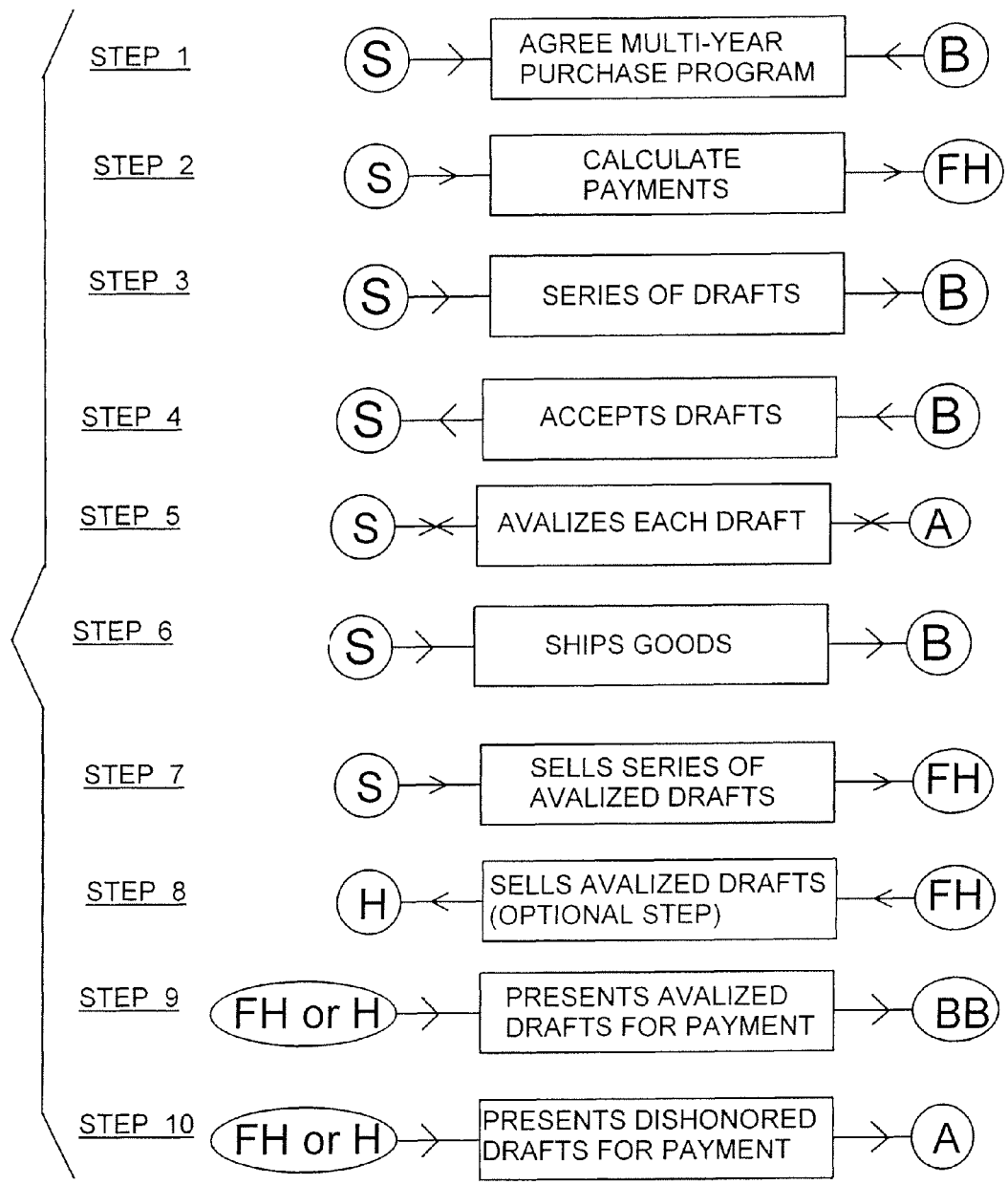
FIG. 3 is a block flow diagram of a further prior art method of international trade financing which method employs forfait financing.
Figure 4A:
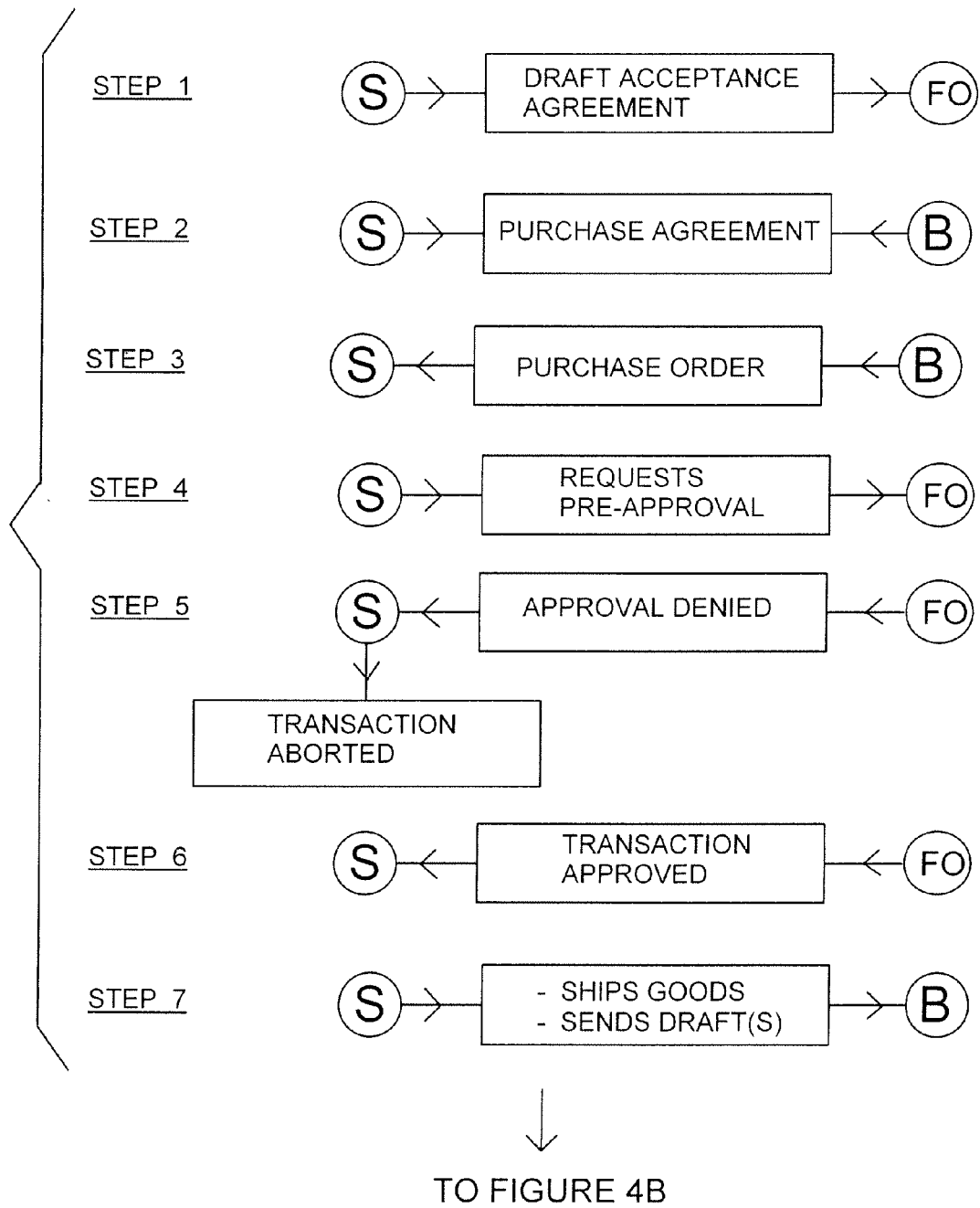
FIGS. 4A and 4B are partial views, to be read as one, of a block flow diagram of a still further prior art method of international trade financing according to the patent to Aharoni.
Figure 4B:
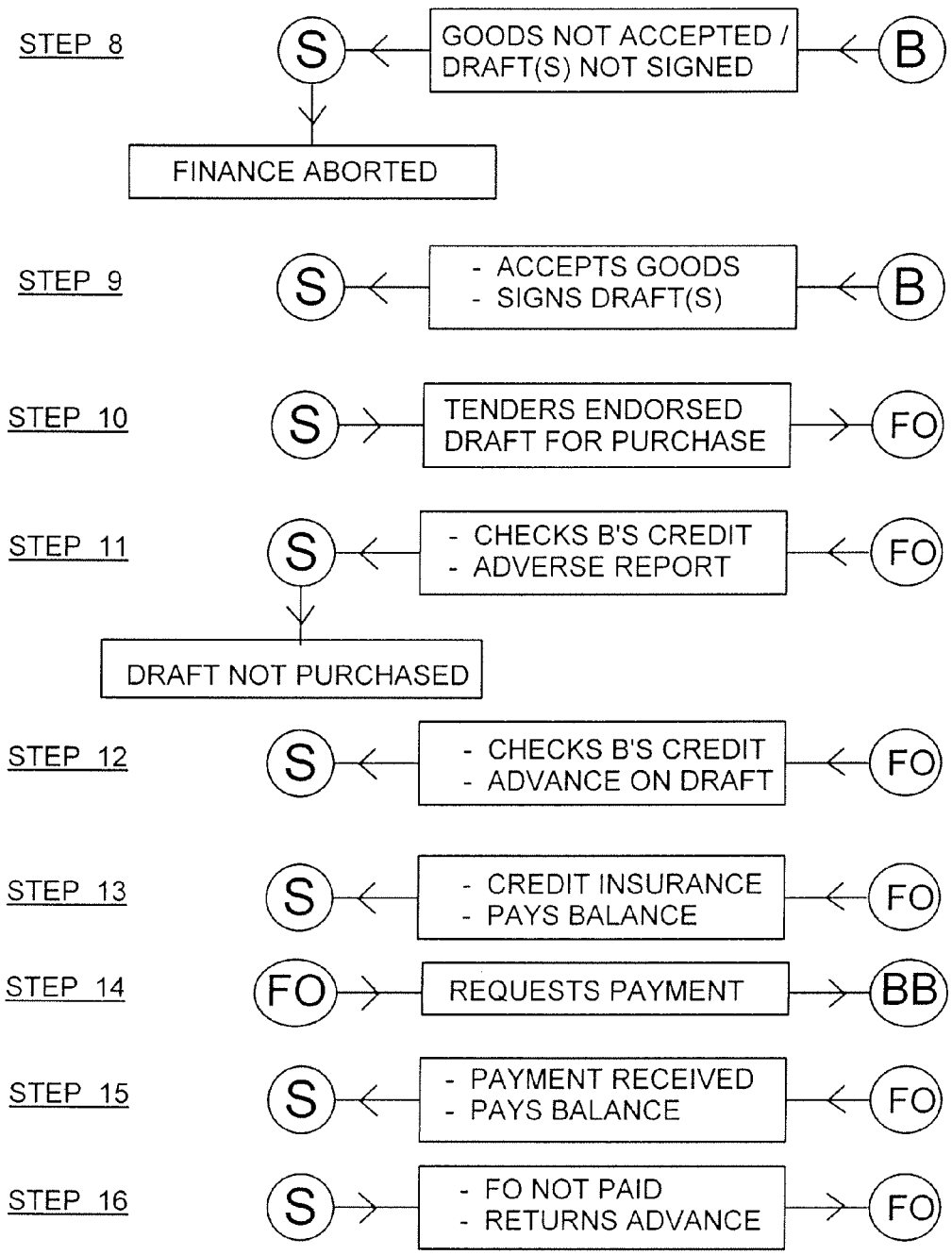

In accordance with the invention a method for moving goods and/or services from a seller to a buyer and involving the transport of goods or a report or other like document or thing is provided. At the same time, the invention assures the movement of a payment for the goods and/or services from the buyer to the seller. This is done by the buyer executing a first document having indicia purporting to legally bind the buyer upon the happening of an event. The buyer sends to the seller the first document having those indicia purporting to legally bind the buyer upon the happening of that event.

In accordance with the invention, the buyer executes a second document having indicia indicating information describing a commercial transaction and sends to the seller the second document having indicia indicating information describing that commercial transaction. The seller notifies a financial institution respecting the execution and sending of the first document having indicia purporting to legally bind the buyer upon the happening of the event. The second document has indicia indicating information describing a commercial transaction. The financial institution transmits to the seller a transaction approval.

At the appropriate time normal in his business, the seller causes the event to occur. Typically, this event is the shipping of goods. The seller sends to the buyer's transaction interface a third document entitling the holder of the third document to those goods or the report or other like document or thing. The seller also sends a fourth document having indicia purporting to legally bind the buyer upon execution of the fourth document and the happening of the event. The fourth document is presented to the buyer, and the buyer executes the fourth document.

The executed fourth document is exchanged for the third document, whereby the executed fourth document is in the possession of the buyer's transaction interface. The third document is in possession of the buyer. The seller provides the first document to the financial institution, and the financial institution issues a fifth document purporting to obligate the financial institution to pay the seller a second payment.

In accordance with the invention it is contemplated that the second payment is the payment less a service fee.

It is also contemplated that the buyer notifies an administrator respecting the execution and sending of the first document having indicia purporting to legally bind the buyer upon the happening of the triggering event and the second document having indicia indicating information describing a commercial transaction. The event may be the transporting of goods or performance of services and it may embody such performance in a report or other like document or thing.

The fourth document may be a second of exchange, and the third document may be an invoice. The second document having indicia indicating information describing a commercial transaction may be a pro-forma invoice.

The event which triggers the legal obligation of the seller may also be the seller's parting with physical control of the goods or the seller's performing the services. The first document may be a first of exchange, and the execution of the first document may be done by ink signature, facsimile signature, or electronic signature. The electronic signature may be the product of a confidential algorithm specific to the buyer, and the confidential algorithm may be responsive to an identification number associated with the buyer and the date of the signature. The indicia may be printed with ink on a sheet of paper or other similar material, or the indicia and the document may be electronic.

Also in accordance with the invention there is provided a method for electronically monitoring and controlling the movement of goods and/or services from a seller to a buyer. It involves the transport of goods or a report or other like document or thing of value, and electronically executing a payment for the goods and/or services from the buyer to the seller.

The buyer, the seller, a financial institution, and a buyer's transaction interface are electronically connected over an information transport system. This is done by the buyer electronically sending to the seller a first packet or packets of information performing the function of a conventional executed document having information purporting to legally bind the buyer upon the happening of an event. The buyer then electronically sends to the seller a second packet or packets of electronic information performing the function of a second conventional executed document having information describing a commercial transaction. The seller then sends a notification packet or packets of such electronic information to the financial institution respecting the sending of the first and second packet or packets of electronic information. The financial institution transmits to the seller a packet or packets of electronic information performing the function of a conventional transaction approval. The seller then causes the event to occur and sends to the buyer's transaction interface a third packet or packets of information entitling the buyer's transaction interface to the goods or the report or other like document or thing. The seller also sends a fourth packet or packets of information which include transaction information which purport to legally bind the buyer upon acceptance by the buyer of the terms of the fourth packet or packets of information and the happening of the event.

The invention further contemplates transaction information contained in the fourth packet or packets of information being presented to the buyer, and the buyer accepting the terms of the transaction information. The fourth packet or packets of information, amended to note the acceptance of the terms of the transaction information by the buyer, all art sent in exchange for rights associated with the third packet or packets of electronic information, whereby rights created by the acceptance by the buyer of the terms of the transaction information are in the possession of the buyer's transaction interface and rights associated with the third packet or packets of information are in the possession of the buyer.

The seller then provides the first packet or packets of information to the financial institution, and the financial institution transmits a fifth packet or packets of electronic information purporting to obligate the financial institution to pay the seller a second payment.

The method may also contemplate the buyer's transaction interface sending to the financial institution a sixth packet or packets of electronic information advising the financial institution of the receipt by the buyer's transaction interface of the third packet or packets of information.

The method may also contemplate the buyer's transaction interface sending a seventh packet or packets of electronic information representing a third payment. It may also comprise the financial institution sending an eighth packet or packets of electronic information representing a fourth payment to the holder of rights created by the fifth packet or packets of electronic information.

The financial institution may also be the seller's bank, and the buyer's transaction interface may be in the buyer's bank.

The first packet or packets of electronic information may perform the function of a first of exchange, the second packet or packets of electronic information may perform the function of a pro-forma invoice, the third packet or packets of electronic information may perform the function of an invoice, and the fourth packet or packets of electronic information may perform the function of a second of exchange.

In the preferred embodiments of the invention, the prerelease payment draft is addressed to a suitable paying party, for example the buyer's bank, or such other institution or party as is agreeable to the seller and buyer. The prerelease payment draft can be payable to the seller, to the seller's agent, to the bearer, to a party collecting on behalf of the seller, or to other such party as may be mutually agreed by the buyer and seller. Preferably, the prerelease payment draft is transaction-independent but identifies a specific transaction between the buyer and seller for the traded product, e.g by code or other unique identifier. The term "transaction-independent" is used herein, unless the context indicates otherwise, to mean that settlement of a draft, or other such negotiation of the draft, is not dependent upon any facet of the transaction such as completion of delivery, or support, or the quality of the product supplied and is dependent only upon the terms of the draft itself. Activation of the draft is however dependent on the triggering event which will usually be transaction related.

The invention provides a novel financial instrument comprising a prerelease bill of exchange which is accepted in advance by a counterparty, for example the buyer, and is returned to an originator, for example the seller, as evidence of willingness to pay the originator a sum certain of money at a specific point in future time, such time to be determined by a pre-specified triggering event.

For the purposes of this invention it is preferred that the pre-release payment draft be signed, or otherwise authorized manually, electronically, or digitally, by both parties to the transaction, for example, the originator and a counterparty. However the sequence in which the signatures, or other authorizations, are applied to the draft can vary.

Usually, it will be more convenient for the originator to sign first and for the counterparty to sign subsequently. In a sell-and-buy transaction, the originator may be either the seller or the buyer. Where the originator is the seller, a preferred sequence is for the seller to originate and sign the pre-release payment draft and forward the draft to the buyer as counterparty. The buyer should then sign the draft, indicating acceptance thereof and return it to the seller, prior to the triggering event. Where the buyer originates the pre-release payment draft, the buyer can sign the draft indicating acceptance thereof and forward it to the seller, prior to the triggering event. The seller will preferably then sign the draft subsequently to the buyer, but prior to negotiating the payment draft with a financial institution or other party. Preferably, seller executes the pre-release payment draft before the triggering event occurs and optionally, forwards a copy of the draft, bearing both signatures, to the buyer.

Thus, the sequence of events can be determined, in practice, as between the parties, each acting in their respective roles, and allowing the agreement process to be incomplete until both parties act. There is no obligation on either party if one or the other of the parties fails to act, until the agreement process has been completed by both parties signing the pre-release payment draft or otherwise acting in what is to each other, an expected and acceptable manner. Preferably also, execution by the buyer and optionally, the seller, of any terms-containing document accompanying the payment draft should be a prerequisitie of completing the agreement to trade.

Conveniently, where the originator is the seller, the transaction can be defined by a pro-forma invoice detailing the goods or services comprising the traded product and preferably also incorporating preferred terms of the agreement between the buyer and the seller. Alternatively, where the originator is the buyer, the details and terms of the agreement may be incorporated in a purchase order. Whether the trade is defined by a pro forma invoice or a purchase order may be a matter of agreement or custom as between the buyer and seller. In a very general way, subject to many exceptions, it may be said that larger entities such as blue-chip corporations, utilities and government entities will prefer to determine their own terms and be the originator, issuing either a pro-forma invoice, or a purchase order, according to the nature of the transaction and pursuant to the invention, also being the originator of a pre-release payment draft, which is preferably linked to the pro-forma invoice or purchase order by reference thereto.

Thus, in the case of an import-export transaction, the process may be initiated and controlled either by the exporter or the importer, acting as originator of the payment draft. An exporter-seller can use a pro-forma invoice to define the transaction, while an importer-buyer may use a purchase order.

It will be understood that an export transaction is a mirror image of an import transaction and that a complete transaction comprises an export of a traded product from one country or region and the import of the product into another country or region. In an export transaction, a proforma invoice, invoice, and shipment of goods are initiated, implemented or effected and controlled by the exporter, whereas a purchase order is neither generated nor controlled by the exporter-seller, and may raise issues regarding item numbers or descriptions of parts in the importer's terms rather than the exporter's.

The opposite is true for an importer. To an importer, particularly for products coming from a catalog with specific descriptions, parts numbers and per piece prices quoted in advance, a purchase order is in the control of the importer, and can accurately be constructed to reflect the terms and conditions under which the importer wishes to buy goods. Thus, many importers may prefer to control the transaction and may do so, pursuant to the invention by employing a purchase order to implement, effect or control the process in an equivalent manner to the way in which an exporter can use a pro-forma invoice.

The prerelease bill of exchange, accepted by the counterparty, the buyer, prior to the triggering event, indicates a willingness and intent of the counterparty to pay. The ability of the counterparty to pay may be determined in a number of ways. Outside credit verification agencies may be employed, to evidence the counterparty's ability to pay. Some agencies may also provide credit enhancement. The combination of willingness to pay and ability to pay create collateral value in the novel payment instrument, the prerelease buyer-accepted bill of exchange. The signed statement of time-specific intent to pay enhances the collateral value.

The method and novel instruments of the invention are particularly, but not exclusively, useful for financing an international trade transaction, wherein a buyer purchases a trade product from a seller across an international border or borders, for example to export from, or import to, the United States.

Preferably also, the payment draft is readily negotiable, through conventional banking or other financial channels, for the full value of the traded product, less any fees and discounts. In a preferred embodiment of the invention, the payment draft is a bill of exchange and subsequent to the date of supply of the traded product, is converted to an enhanced financial instrument, for example a banker's acceptance, which is more readily negotiable than a buyer-executed payment draft. By prior arrangement with the financial institution issuing the enhanced instrument, the payment draft may be pre-approved, simplifying the conversion process and quickly yielding the seller a pre-approved draft on a financial institution, e.g. a pre-approved banker's draft, which, once accepted, can be internationally negotiated, without undue difficulty for cash or a cash equivalent. These and other steps in the methods of the invention can be managed or facilitated by computer-implemented software, which can be operated by a trade finance process manager being an individual or organization additional to the seller, the buyer and the financing institution.

A further problem solved by a preferred embodiment of the invention is that of timely providing the seller with a financial instrument which is not only readily negotiable, but which is independent of the trade transaction, does not depend upon the seller to extend credit and is non-recoursable by the buyer, which is to say free of merchandise claims on the seller by the buyer.

Preferably, the right of recourse is removed from the payment cycle by agreement between the buyer and the seller, which agreement is preferably also specific to a single transaction or to a series of transactions between the same buyer and seller, and is completed prior to release of the traded product. In an important preferred embodiment of the inventive method the buyer and seller contractually agree to settle merchandise disputes, outside the payment process, according to independently devised and recognized rules, for example the League of Nations 1930/1931 convention on payments (*Convention Providing a Uniform Law For Bills of Exchange and Promissory Notes*, Geneva, 1930, presently available on the Internet at http://ananse.irv.uit.no/trade_law/doc/Bills.of.Exchange.and.Promissory.Notes.Convention.1930.html). Other equivalent and suitable international treaties, national laws or recognized reference documents may be invoked, if desired, for this and other purposes to facilitate the transaction and avoid disputes. Some suitable examples are further described hereinbelow. Use of such an international convention, or the like, is particularly valuable for international trade transactions, providing a balanced and fair resolution mechanism that is widely recognized and acceptable to residents of many nations.

In a still further particularly preferred embodiment of the invention the seller furnishes the buyer a pro-forma invoice prior to release of the traded product. Conveniently, the pro-forma invoice defines the particulars of the product to be traded, including pricing and shipping, if appropriate, and its details can be negotiated to the buyer's satisfaction. Preferably the pro-forma invoice includes an agreement that the buyer will pay against a sole first or a second bill of exchange and includes a non-recourse agreement, for example an agreement such as that described above, to remove trade disputes from the payment cycle, referencing a suitable international convention. The pro-forma invoice preferably is signed by both the buyer and seller before release of the traded product. Conveniently, the pro-forma invoice accompanies the prerelease payment draft proffered to the buyer prior to shipment. Preferably, also, the prerelease payment draft references the pro-forma invoice to define the traded product. Alternatively, but less conveniently, these particulars and agreements could be incorporated in a purchase order furnished by the buyer. The name of the document, and even the issuer, can be varied. What is desirable for a preferred document is that it define the transaction with particularity and include payment and non-reecourse agreements such as those described above.

In one preferred embodiment, the prerelease payment draft is a bill of exchange accepted by the buyer which, being executed, on, at or before release of the traded product by the seller, or their agent, may be designated a prerelease bill of exchange. Once executed and accepted, by the buyer, the bill of exchange becomes a trade acceptance. Optionally and preferably, but not necessarily, the prerelease bill of exchange is the first of two similar, mutually extinguishable bills of exchange, respectively designated a "first of exchange" and a "second of exchange" herein, each of which is payable only when the other remains unpaid. Preferably also, the first and second of exchange are created, in sequence, at different times, yet have identical maturity dates. This novel use of two similar, mutually extinguishable bills of exchange, pursuant to the invention permits enhancement of the collateralization of the credit extended to the buyer. Use of two interdependent bills of exchange enables one, preferably the first, to be held as collateral in one location while the other, preferably the second, is used for collection. By virtue of the mutual extinguishability feature, collection made on the second bill of exchange automatically extinguishes the collateral provided by the first, without any further action being required.

The term, or "tenor" of the prerelease payment draft, calculated from the release date, or other specified event date, to the maturity date, can be any suitable term as agreed between the buyer and seller. The tenor can for example be 30 days, but may be somewhat longer, for example 60, 90 or 180 days, depending upon the credit term required by the buyer. In practice longer terms are unlikely to be appropriate, but the invention is of course not limited to any particular tenor.

While the invention contemplates that the prerelease payment draft will usually be a time draft, it will be understood that the payment draft could be payable on demand after supply of the traded product, such a requirement, calling for prompt or immediate payment to be made by the buyer to the addressee, for example by debiting the buyer's account. Though not yet fully developed, electronic payment employing electronic means and electronic document interchange standards, such as the ANSI X12 standard, EDIFACT or SWIFT, with suitable authentication can facilitate such payment on demand.

The method of the invention enables the seller to obtain payment promptly after releasing, delivering, shipping or otherwise supplying the traded product, by negotiating the buyer-executed prerelease payment draft, yet at the same time provides a creditworthy buyer with time to pay. A buyer's natural reluctance to prepay a seller is overcome by making the payment draft activatable upon an agreed specific triggering event occurring after execution of the draft by the buyer, for example release of the product. The term for payment is then calculated from the date of the event.

The event can, in most cases be the date when the traded product is released from the seller or possibly, particularly in the case of services, the date of delivery to the buyer. Other pertinent events could however serve to activate the draft, for example progress of manufacture of the product to an agreed stage or a buyer-related event, such as receipt of proceeds of an asset sale. Release of the traded product from the seller's control should then await news of occurrence of such a buyer-related event. Alternatively, the triggering event might itself be a future date certain. In such case the buyer may need a safeguard against possible failure of the seller to release or deliver the traded product in a timely manner. If the triggering event does not occur, for example, because the seller fails to release the traded product, the payment draft is inactive and worthless, the buyer loses nothing. The buyer gains the advantage of prepayment (inducement for the seller to release the product) without having to worry about retrieving a prepayment if the seller reneges or is otherwise unable to fulfil their offer.

Release of the traded product (goods or services or a combination thereof) by the seller can be effected by delivery of the traded product to the buyer or the buyer's agent, or to a carrier, or by such other step as releases the product from the control of the seller, or its agent, to the control of the buyer, or its agent with instructions for the product to be delivered or supplied in accordance with the buyer's wishes.

Because, in most cases, by the nature of the draft, no maturity date can be determined until after the traded product is released from the control of the seller, the payment draft is not activated, or triggered, and therefore is not normally negotiable through conventional channels, until after the traded product is shipped, delivered, or otherwise released by the seller. By providing documentary evidence of such release, for example shipping documents, along with the payment draft duly executed by the buyer, in many instances the payment draft can then be processed through conventional banking channels in the manner of a trade acceptance drawn on the buyer, providing immediate payment to the seller, subject to conventional discounts.

In a preferred embodiment of an import purchase order process, according to the invention, the pre-release payment draft is a bill of exchange accepted by the buyer at the time of the issuance of the purchase order which specifies the terms, conditions and triggering event or events under which the seller may actuate the bill of exchange at a later date, by performing the agreed upon acts specified in the purchase order.

In such a purchase order implementation process, the buyer signs the acceptance portion of the bill of exchange as if the seller, as originator, had supplied the document to the buyer. Since the buyer is ordering the goods, and intends to pay under terms and conditions mutually agreeable between buyer and seller, and is in fact the paying party, then the buyers's early acceptance of the bill of exchange is confirmation of the buyer's willingness to pay. The seller as in previous examples, still must determine the ability of the buyer to pay, and must agree to the terms and conditons that will trigger payment.

There is no obligation to pay, until and unless both parties sign the bill of exchange. Whether the seller signs first or the buyer does is not relevant, so long as both parties sign the document. Then, the fact that both have signed means that they have agreed both to the terms and conditions of the underlying transaction which supplies a triggering event, and to the method and timing of payment as set forth or implied in the documents.

Accordingly, a purchase order-driven transaction, whether it be across a foreign border or a domestic transaction within a national or regional jurisdiction, can be managed and controlled, with the assistance of electronic document generation, in a comparable manner to the way in which business-to-business checks are now issued by many businesses employing shrink-wrapped software packages. In this light, the invention contemplates a novel capability, whereby a purchase order is combined with a two-signature bill of exchange, preferably on a single sheet of paper, optionally separated by a perforation, like a business check and remittance advice, and preferably also of a similar size and shape to such a business check. A more particularly preferred embodiment of such a purchase order-draft emobdies the invention as described herein with regard to relevant agreement clauses in the purchase order and a triggering event in the draft.

By leaving the issuance date blank, the accepting party can allow the issuer as issue to fill in the date of the triggering event as specified in the purchase order and to sign as issuer after the accepting party has signed as acceptor.

The acceptability of such a document should depend solely on the accepting party's willingness and ability to pay upon presentation of the document. Since the transaction contemplated is initiated, implemented, effected or controlled by the accepting party, they are the sole determiner of the use of such a document and can issue it at will.

Another valuable and preferred embodiment of the invention provides a value-enhancing mechanism to improve the negotiability and the value of the trade acceptance constituted by the buyer-executed payment draft. For example, prior arrangement can be made with a bank or other financial institution to substitute a banker's acceptance for the trade acceptance. Such a banker's acceptance, or bank draft, will usually be quickly, readily and economically negotiable, especially if the bank is internationally recognized. Preferably, credit enhancement, or a credit enhancement process, is offered to the bank or other financial institution, as an inducement to make the substitution.

Figure 5:
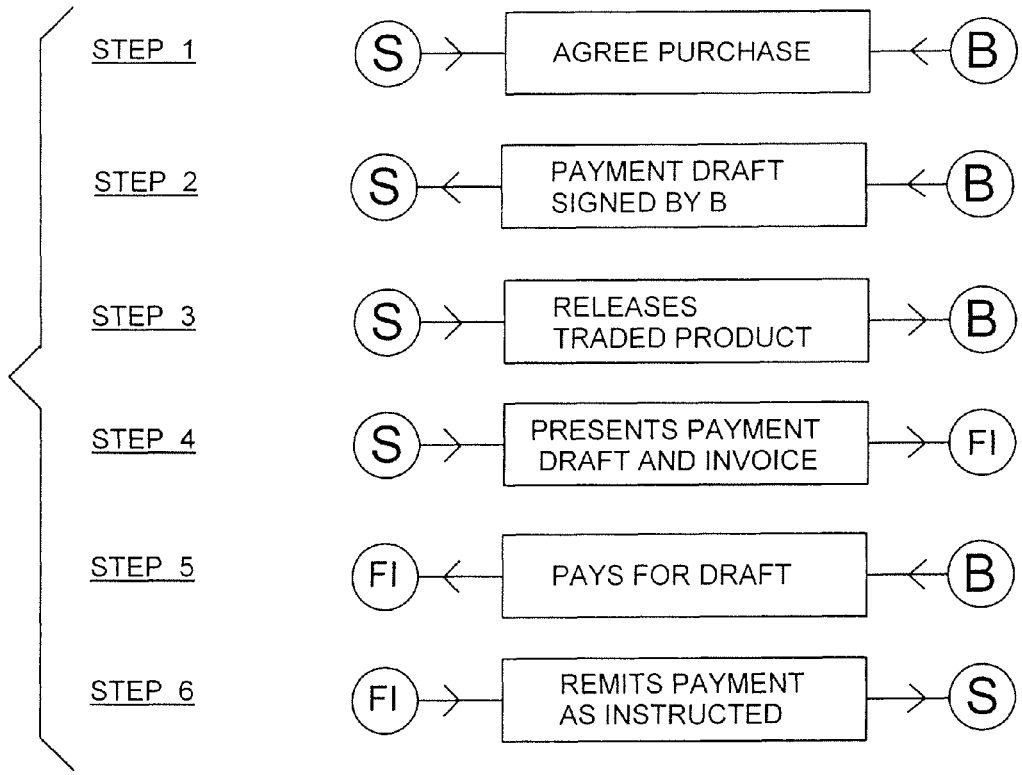
FIG. 5 is a block flow diagram of one method of trade financing according to the invention.
Figure 6:
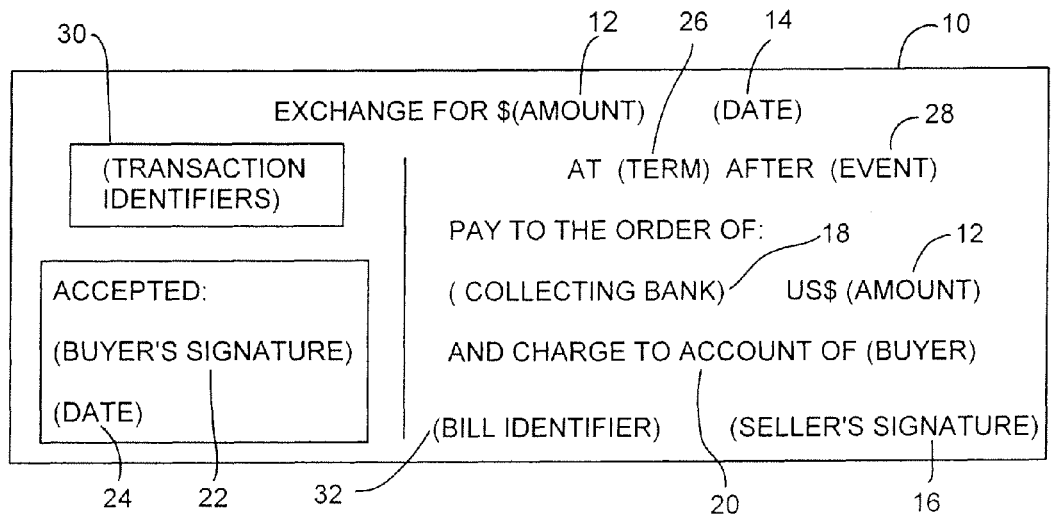
FIG. 6 is a schematic representation of a bill of exchange useful in practicing the method shown in FIG. 5.

Referring now to FIGS. 5 and 6 of the drawings, the method of trade financing shown commences in step 1 with an agreement for a buyer B to purchase a traded product from a seller S. Without limitation seller S could, for example, be an exporter of manufactured goods from the United States, or any other country, while the buyer is an overseas importer of such goods into another country, for example, Japan. Alternatively, the domiciles of the buyer and seller could be reversed.

In step 2, after prices and product specifications have been agreed, but before product is released, pursuant to the invention, buyer B signs a prerelease payment draft 10 and returns it to seller S who withholds release of the product until the signed draft 10 is received by seller S or its agent.

Referring now to FIG. 6, one form of suitable prerelease draft 10 is shown as being a bill of exchange designed for creation and acceptance prior to release of goods or services. The particulars are believed largely self explanatory, noting that variable items are shown in parentheses. An amount 12 is the full value of the transaction, i.e. of the cost to the buyer of the traded product, with or without freight and insurance, and with or without interest, depending upon the terms of the purchase agreement made in step 1. Date 14 is the date of issuance of prerelease draft 10 and can be presumed to be the date when the seller's signature 16 is applied.

Prerelease draft 10 is payable to the order of a collecting bank 18 which may be designated by the seller and may be a bank with which the seller has made a prior arrangement for negotiating the draft. Prerelease draft 10 is drawn on B's account 20 at B's bank, and charged to B's account, but could be drawn on other financial institutions and accounts, if so desired by the buyer or seller.

Of note is that payment draft 10 calls for the buyer's signature 22 to be applied, indicating acceptance of payment draft 10 by the buyer. When signed by the buyer payment draft 10 becomes a trade acceptance. The date 24 when buyer B's signature 22 is applied is independent of the date of application of seller S's signature and commonly, but not necessarily, will be a later date. Prior to application of B's signature 22, prerelease draft 10 comprises an offer to do business by the seller, on condition of payment within a term to be triggered by the event of release, shipment or delivery of the traded product, whichever is specified.

In the event that release by the seller, or its agent, to the control of the buyer, or its agent, of goods or services is instantly preceded by acceptance of the draft, as a condition of release, as contemplated by this invention, then the tenor of the draft, which is the time to payment, may be "at sight".

In the example shown, the term 26 of prerelease draft 10 runs from the shipment date, event 28. Accordingly, prerelease draft 10 is dormant until the traded product is shipped, which event activates the draft. Proof of shipment will usually be required to negotiate prerelease draft 10. A transaction window 30 can contain transaction identifiers that permit identification of the transaction agreed in step 1 and the particulars can be memorialized in a separate document, for example a pro-forma invoice, as described hereinbelow. Exemplary transaction identifiers in transaction window 30 can comprise a selection of one or more from an exporter identification number, a proforma invoice identification number, a credit insurance company's control number, an invoice number, a shipment number, a customs internal tracking number "ITN" and an importer identification number, as well as, for tracking purposes, a 1oE/2oE notation to indicate the nature of the bill. Though designated "number" those skilled in the art will understand that an alphanumeric, or alpha only identification code may be used, if desired. Preferably, all the identifiers are used. Also, if desired, payment draft 10 can bear its own identification code, bill identifer 32.

This transaction information can be employed to ensure that any particular shipment is the proper shipment to activate prerelease draft 10 and the completeness of the transaction identifiers indicates the progress of the transaction on the bill. Once activated, prerelease draft 10 is transaction independent, save for calculation of its term from the transaction shipment date, and thus may be freely negotiated without further reference to the transaction status, as is customary for a bill of exchange.

Prerelease draft 10, designed for issue and acceptance, on, at, before, or in anticipation of, release, shipment or delivery of the traded product, or service, constitutes a novel financial instrument pursuant to the invention.

Standard practices for bills of exchange are defined in the League of Nations Convention Providing a Uniform Law For Bills of Exchange and Promissory Notes, (Geneva, 1930), and in a subsequent revision called the UNCITRAL convention, the UNITED NATIONS CONVENTION ON INTERNATIONAL BILLS OF EXCHANGE AND INTERNATIONAL PROMISSORY NOTES, presently available on the Internet at http://www.his.com/-pildb/bookletb.html. UNCITRAL is expected to supersede the 1930/1931 League of Nations convention when signed and accepted by the required governments.

Referring again to FIG. 5, in step 3, after seller S receives prerelease draft 10 signed by buyer B, the traded product is released to a carrier, or to an import-export agent or the like, for delivery to buyer B. At this point, seller S is secure in the knowledge that possession of accepted payment draft 10, which can be redeemed after shipment, eliminates any risk of his being put in the position of having released the traded product only to find that, for one reason or another, buyer B is unwilling, or unable, to pay for it. For example, absent the commitment made by accepting prerelease draft 10, buyer B might have purchased equivalent product from another vendor.

In step 4, after shipment, seller S presents prerelease draft 10, along with the invoice, and proof of release of the traded product, to a suitable financial institution FI, receiving full value of the purchase, less commissions and discounts. Step 4, considered in isolation, is similar to the traditional discounting process of bill broking, a process formalized in the UK in 1825. For redemption the draft is accompanied by shipping documents attesting to the date shipment and the validity and activity of the draft. In this embodiment financial institution FI effectively extends credit to buyer B, interest and fees for which are discounted off the redemption payment made to seller S. Financial institution F1 will in this case require evidence of buyer B's ability to settle prerelease draft 10 at maturity, before redeeming the draft. Meanwhile, seller S has been paid in full.

In step 5 of the method shown, at maturity of prerelease draft 10, financial institution FI collects payment from buyer B.

In the embodiment of the invention described with reference to FIGS. 7-8, the method includes the features of the prior FIG. 5 embodiment and adds a novel process wherein a trade acceptance TA, for example, the buyer-accepted prerelease draft 10, is exchanged for a more negotiable instrument in a draft substitution process. The more negotiable instrument should enhance the quality of the payment instrument for the seller and is preferably, a banker's acceptance BA, although other enhanced quality instruments that may be used will be apparent to those of ordinary skill in the art. The draft substitution, or conversion, process can be further enhanced by prior arrangement for issuance of a pre-approved banker's acceptance, details of which are described more fully hereinbelow.

In the method described with reference to FIGS. 5-6, the trade acceptance comprised by the buyer-accepted prerelease draft 10 may have only limited negotiability, perhaps being redeemable only with a financial institution that has established a credit line for the buyer, for example with buyer B's bank. In the case of an international transaction, B's bank can be expected to be in a different country from the country in which seller S resides. This geographical difference, legal, cultural and other difficulties, may impose severe impediments to negotiation of accepted prerelease draft 10 by seller S. Rarely, certain blue chip buyers may have a reputation that makes their paper acceptable to a wide range of institutions. In other cases, it would be desirable for the seller to have a more negotiable instrument. Such a more negotiable instrument is provided, pursuant to the invention, as illustrated in the embodiment of FIGS. 7-8, by employing a draft substitution process, wherein a banker's acceptance "BA", separately issued, pre-approved and, preferably also, pre-accepted, is substituted for the underlying trade acceptance represented by the buyer-executed first of exchange.

Before describing the trade financing method illustrated in FIGS. 7 and 8, the draft substitution process will be discussed further in the context of a transaction employing mutually extinguishable first and second bills of exchange, the first of exchange being an embodiment of a prerelease draft 10.

The draft substitution process provides seller S an attractive alternative process for redeeming or negotiating the first of exchange. The draft substitution process will often be preferable to discounting the first of exchange, which may be difficult, or require an unacceptably deep discount to be given, depending upon the reputation of the buyer. Pursuant to the draft substitution process of the invention, the seller submits the first of exchange, along with proof of occurrence of the triggering event, which may for example be a delivery instrument, to the financial institution, or to a third party administrator acting on behalf of the financial institution. The first of exchange can be held as collateral by the financial institution or the third party administrator and, accompanied by the delivery instrument, or other event proof, can be used at any time up to the maturity of the bill's tenor (time) to force payment at tenor, according to international treaty and practice. Separate holding of the collateral provided by the first of exchange allows the financial institution great leeway in the processing of collections and payments.

Further enhancement of the draft substitution process can be effected by suitable contractual arrangements between the seller and the financial institution or its representative which are made before release of the traded product. A particularly desirable arrangement is to make prior provision for issuance of a pre-accepted banker's acceptance, whereby the financial institution agrees ahead of time to issue a banker's acceptance and substitute it for the buyer-accepted trade acceptance, the first of exchange.

To this end, prior to offering their goods or services to the buyer, seller S enters into an acceptance-issuing agreement with a suitable financial institution, the acceptance-issuing party, which is capable of accepting bills of exchange or drafts The acceptance-issuing agreement defines a process which results in the creation of a banker's acceptance, or a previously accepted banker's acceptance which the financial institution is willing to substitute for a trade acceptance. The acceptance-issuing agreement preferably sets forth contractual criteria to define the trade transaction and to define the parties to the trade transaction, i.e. the seller and the buyer. Preferably also, unique identifying numbers are recited in the acceptance-issuing agreement for the parties to the transaction and for one or more transactions they plan to consummate. These identifiers can subsequently be used on the face of the transaction documents themselves to define the particular transaction, and transaction parties to which the documents relate.

To induce the acceptance-issuing financial institution to substitute its credit for that of the buyer, one of many forms of credit enhancement process may be employed, including but not limited to credit insurance, avals, guarantees, cash or other collateral, letters of credit, and so on.

In one example of such an acceptance-issuing agreement, seller S authorizes, by limited power of attorney, the acceptance-issuing party to create a bill of exchange on behalf of seller S, the drawer, on the acceptance-issuing party, the drawee, for the dollar value of the draft substitution process, less fees as agreed. The acceptance-issuing party agrees to issue and accept the bill of exchange drawn on itself, for example a first of exchange in the process of the invention, or a sole bill of exchange, at a future date certain. The future date certain may be a specific term, e.g. 10, 30 or even 90 days, from a future event date, relevant to the trade transaction financed by the pre-approved banker's acceptance, for example a shipment date. This agreement creates the desired pre-approved banker's acceptance which is backed by the issuing financial institution's credit and reputation and, depending upon the institution, may have world-wide acceptance. The pre-approved banker's acceptance provides valuable collateralization of the transaction for seller S, since banker's acceptances have wide acceptance, and are discountable at low rates. Seller S also benefits from a process that is event driven and which for an exporter-seller, can convert foreign risk on an unknown foreign company, to domestic risk on a known and generally acceptable financial institution. This feature is of particular value to sellers in the major industrial-financial countries, for example, the United States, Europe, Japan, Canada, Australia and the like. Other forms of acceptance-issuing agreement, or of equivalent credit-enhancing agreements, will be apparent to those skilled in the art from the teachings herein.

To avoid disputes between buyer B and seller S, or to facilitate their resolution, one or more suitable treaties or conventions may be specifically invoked by reference in the transaction documents, or may be inherently applicable to the transaction as a result of international agreement, or prevailing national law. In particular, as stated above, the League of Nations 1930/1931 convention (or a successor convention) is useful for defining bills of exchange and for providing parameters for settlement of recourse issues.

Some examples of other useful agreements and laws are: ICC INCOTERMS1990 (ICC Publishing S. A., Paris, France) which provides a set of international rules for the interpretation of common foreign trade terms; International Chamber of Commerce Universal Commercial Practices 500 governing the processing of documentary credits (including letters of credit); the UNCITRAL Model Law on Bills of Exchange, if and when adopted; and the Vienna Convention on International Sale of Goods, to which the United States acceded in 1998. Preferably, the buyer and seller contractually acknowledge suitable treaty law, which may be so invoked whether or not the relevant jurisdictions have acceded to the treaty.

A desired convention may be easily invoked by referencing it in a document signed by both buyer B and seller S, the buyer's signature being the more important. Pursuant to the present invention such a document is a pro-form a invoice specifying the transaction details and describing the traded product. Conveniently the pro-form a invoice can accompany the first of exchange which may reference the pro-form a invoice. The pro-form a invoice should also be executed on or behalf of the buyer, to indicate acceptance of its terms by buyer B, and should be returned to seller S, prior to release of the traded product.

The pro-form a invoice is in the nature of an offer extended by seller S to do business with buyer B on the terms set forth in the pro-form a invoice. Buyer B's signature indicates acceptance of that offer on those terms. It would be desirable to permit certain limited changes to be made to the transaction particulars after buyer acceptance of the pro-form a invoice and before the transaction is completed. For example, either buyer B or seller S may wish to make minor adjustments in the product to be supplied. Accordingly, the pro-form a invoice preferably includes a variances agreement, or provision defining specific changes or classes of change to the transaction particulars, which may be implemented after buyer B has returned and executed the first of exchange to the seller, and before the traded product is released by the seller or their agent, to the buyer, or before the transaction is otherwise completed. Such a variances agreement can permit specified changes to be effected by issuing an amended first of exchange which, when accepted and returned to the seller by the buyer, evidences a mutual understanding between the buyer and the seller as to the changes they contemplate. Based upon the credibility and collateral provided by the seller's possession of an executed first of exchange, execution requirements for the amended first of exchange may be less onerous than for the original document. For example a faxed or electronically generated document may be accepted.

Use of a second bill of exchange as a collection instrument enables the first of exchange and the collateral it represents to be physically retained in a location within a legal jurisdiction acceptable to the financial institution, while the second of exchange is used elsewhere for collection from the buyer or their agent. Such location may be remote from the buyer or the buyer's bank, and may even be in another country. Preferably, the first and second bills of exchange employed in the trade finance process of the invention have substantially identical characteristics, save for different document identifiers, different descriptors, i.e. "first of exchange" and "second of exchange", respectively, and, usually although not necessarily, sequential creation dates. The instruments are mutually extinguishable, which extinguishability is suitably indicated on the face of each document by respective phrases such as "First of Exchange (Second Unpaid)" and "Second of Exchange (First Unpaid)". In a preferred embodiment, the invention provides an electronic document generation process which has controls to ensure that the amount, parties, tenor, and due dates of the first and second bills of exchange are identical, so that payment of the first extinguishes the second, and payment of the second extinguishes the first.

At the time of making this patent application, it is preferred that the original first of exchange be a paper (or equivalent) document bearing the original or actual signature of the buyer and preferably also of the seller. Such an originally signed paper first of exchange is desirable to fulfil the requirements of the League of Nations 1930-31 convention. However, as explained elsewhere herein, adoption of subsequent international agreements, such as the UNCITRAL convention may enable these requirements to be met electronically in the future. Features such as electronic authentication, optionally verified by a digital certificate, effected by personal data identifying the buyer, such as thumb print or iris image data, or other electronically signature, may facilitate the use of electronic rather than paper documents, and the invention includes such variations.

While the original first of exchange should, at present, be a paper document, if desired, any amended first of exchange can be a faxed or electronic mail or other sufficiently credible electronically transmitted document. In particular, it is contemplated that faxed amended documents purporting to be signed by the buyer can constitute a substitute undertaking under the same terms and conditions as the unamended originals. Also, such a variance agreement can provide that, for agreed specified changes, the buyer will not raise legal, signature, or authentication defense against the presentment of faxed and possibly, documents transmitted by e-mail or other electronic means.

It will be understood that the invention is not limited as to the medium in which the trade transaction documents are expressed. Current practice in international trade is still to rely upon paper documents and to use paper as the medium of transport of executed documents, as they are passed from one party to another, notwithstanding that the documents may have been created, reproduced or transmitted electronically. However, the rapid emergence of electronic commerce in recent years suggests that electronic documents will soon be accepted pari passu with paper documents. In the interim, paper documents and electronic documents can be expected to exist side by side for some time as different legal jurisdictions introduce changes.

Figure 7:
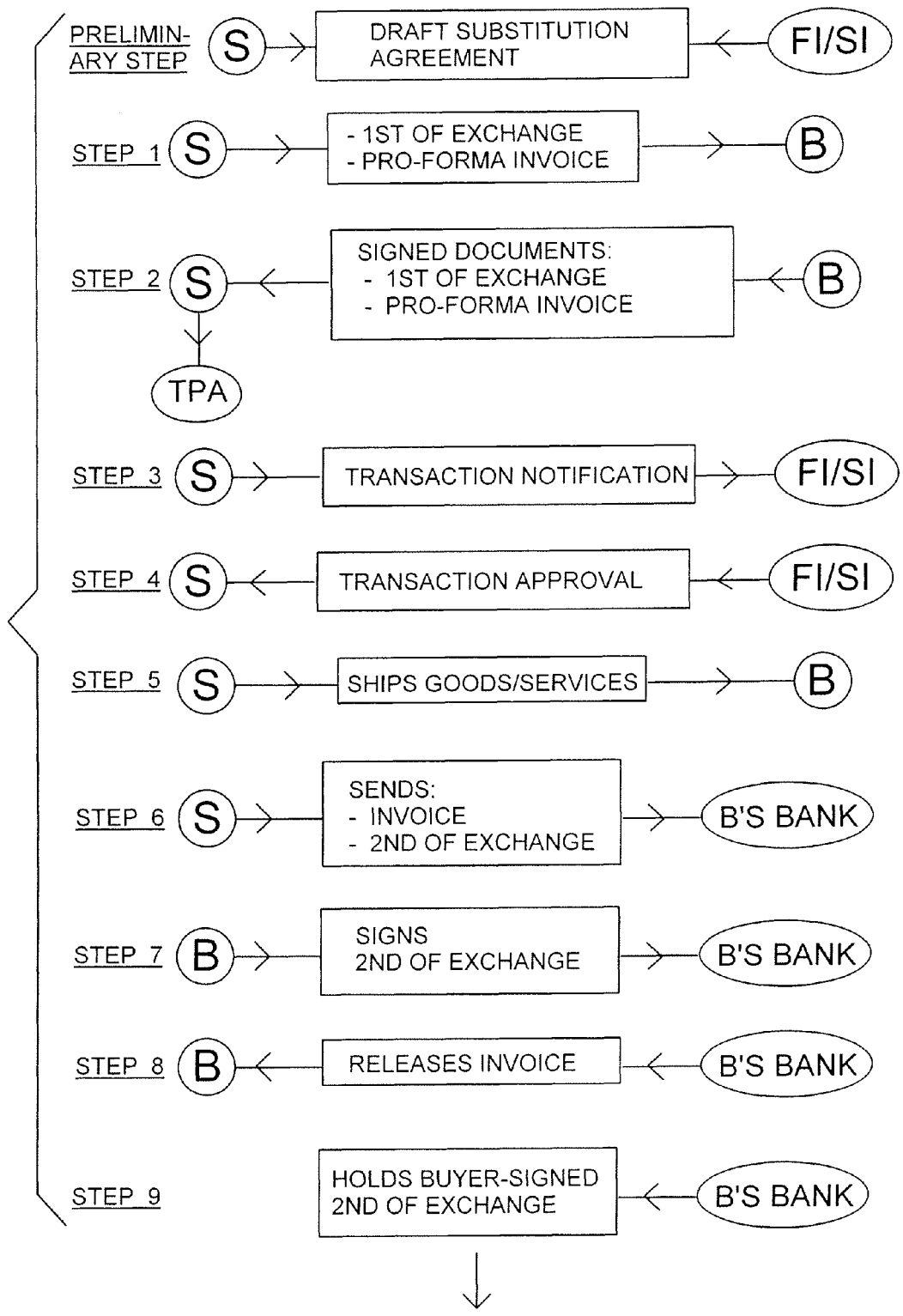
FIGS. 7 and 8 are partial views, to be read as one, of a block flow diagram of a further method of international trade financing according to the invention.
Figure 8:
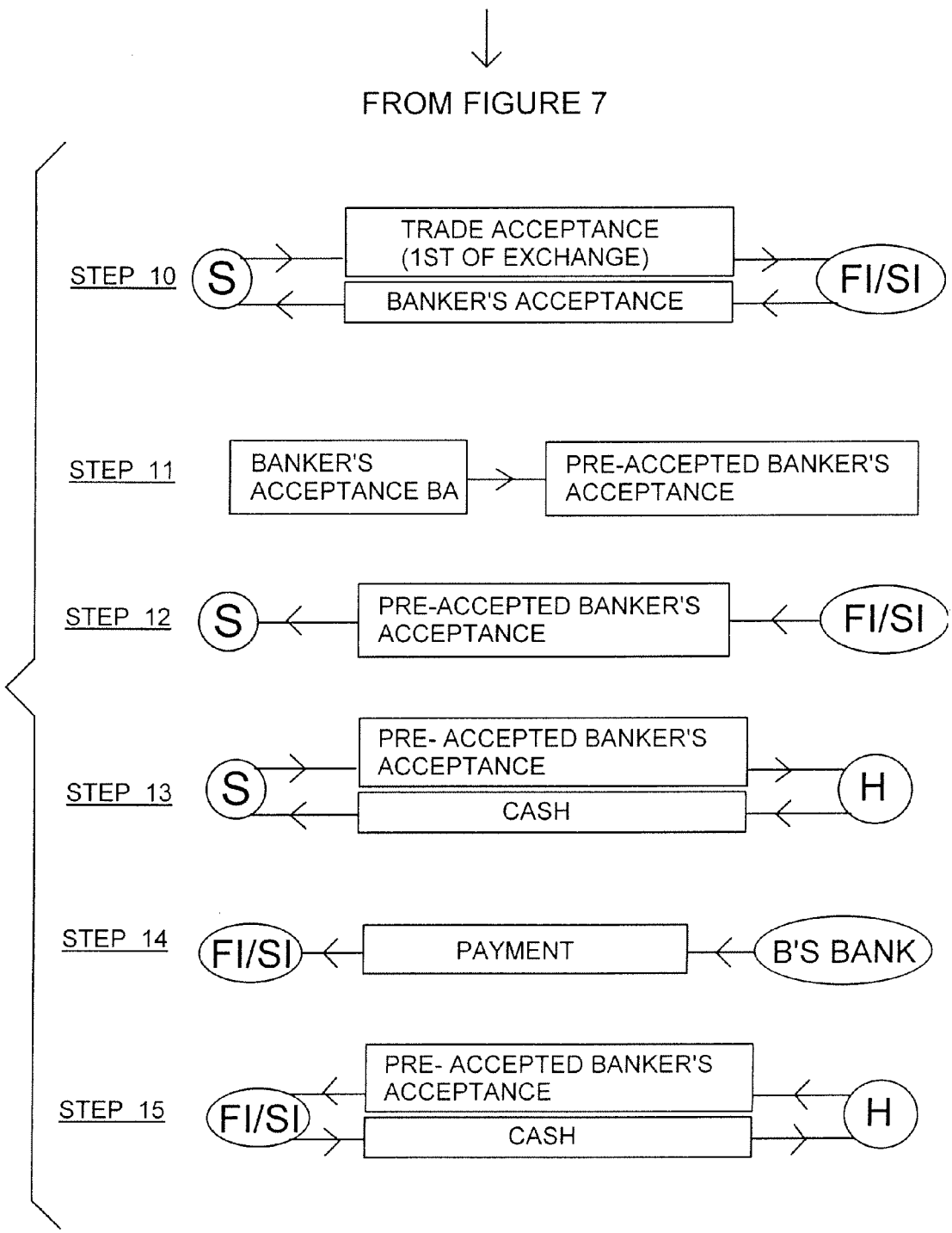

Referring now to FIGS. 7 and 8, the method of trade financing illustrated comprises a number of transactional steps conducted between seller S, buyer B and a financial institution or its service intermediary, referenced FI/SI in the drawings and hereinafter. In practicing the invention, the steps of the method should usually be carried out in the sequence shown, although variations to the sequence will be apparent to those skilled in the art having the benefit of the teaching herein. Other parties to the process may include a holder H of a banker's acceptance an issuing bank IB, and a third party administrator TPA of the trade financing process. In a particularly preferred embodiment, third party administrator TPA employs a document image work flow system (not shown in FIGS. 7-8) to facilitate and oversee the implementation of the method shown.

Preferably, although not necessarily, the method commences with a preliminary step, as shown in FIG. 7, in which financial institution FI/SI pre-approves, for seller S substitution of a banker's acceptance for a first of exchange accepted by buyer B.

In step 1 seller S sends buyer B a pro-form a invoice accompanied by a first bill of exchange, "first of exchange" herein. The pro-form a invoice itemizes or summarizes the goods or services to be supplied and the amount to be paid as agreed in the preliminary negotiations preceding the transaction steps illustrated. Preferably, the pro-form a invoice includes, as described above, a contractual condition removing merchandise claims or disputes from the payment cycle for resolution in accordance with international convention or treaty.

The pro-form a invoice preferably comprises customary invoice data identifying the buyer and seller and listing the total amount of the transaction, the method of shipment and optionally also providing a line-by-line itemization of the goods to be shipped. Additional optional data may relate to terms of payment and may include identifiers of, or references to, any of the instruments or payment methods of the invention described herein. Date information is preferably also provided, including an issuance date for the pro-form a invoice, a deadline for completion and execution of the accompanying first of exchange, and possibly also a shipment date or deadline for shipment of the relevant goods by the seller.

The sales agreement embodied in or accompanying the pro-forma invoice can also include choice of law clauses specifying laws applicable to the offer and acceptance cycle and to the underlying trade transaction. For example, reference can be made to laws of the state of a national or supranational territory such as the United States of America or the European Union. Preferably, for international trade transactions, an international treaty is specified, for example, the Vienna Convention on the International Sale of Goods, which the United States and most industrial countries have ratified. Where one party is domiciled in a country not a party to the treaty, treaty law can nevertheless be invoked by contract to provide a uniform legal basis for multiple transactions, and to reference a body of transaction law which can be acceded to, and from which derogations or variations can be made by agreement.

The pro-forma invoice provides a convenient vehicle for embodying not only the transaction particulars but also the above-described transaction-specific agreements, because the triggering event will usually be controlled by the seller. Therefore the seller will create the document that accompanies the goods, namely the invoice. In this case the pro-forma invoice is a system precursor of an actual invoice. The latter can be quickly and accurately generated from the former.

However, other documents could be used to embody the sales or purchase agreement terms preferred by the invention, as described herein, for example a purchase order. Such purchase order should also be signed by the buyer in order to have the same force and effect as the signed pro-forma invoice described more fully herein.

As referenced hereinabove, once step 1 has been completed with execution of paper documents, by agreement which may be incorporated in the documents employed in step 1, subsequent documents correcting changing, amending or expanding the transaction can be exchanged by electronic means such as fax, email, or data transfer so long as they appear on the face to be authentic, or bear or are accompanied by electronic authentication, such as described above, and come from a source and through a process generally recognized by both parties in the normal course of business.

The first of exchange is preferably also drawn in compliance with the 1930 League of Nations convention, or successor conventions, and is made out in the amount of the pro-form a invoice. The pro-form a invoice is linked to the first of exchange, initiating the draft substitution process, for example by explicit reference to the first of exchange, or by identification of the pro-form a invoice on the first of exchange. The first of exchange is completed and executed by the buyer, for presentation to the buyer for payment at a later date, for example, a date certain specified as a fixed term after shipment, delivery or other agreed event.

By signing the pro-form a invoice, and accepting the first of exchange, both of which are authorized, issued by or on behalf of and preferably executed by seller S, buyer B establishes the basic terms and conditions agreed between buyer B and seller S. In international trades this offer and acceptance cycle between buyer B and seller S, will usually be governed by the Vienna Convention on Contracts for the International Sale of Goods (available from www.cisg.law.pace.edu/www). Buyer B's signatures on both the pro-form a invoice and the first of exchange establishes an amount, and a date certain for payment, at a specified interval after shipment or provision of the goods or services (or both). The signed documents are returned to seller S, step 2. Optionally, seller S may forward the signed pro-form a invoice and first of exchange to a third party administrator TPA who holds the first of exchange as collateral for the transaction.

It is also contemplated that the first of exchange can be created or transmitted, or both, by a suitable agent of the seller, for example, a trusted third party such as a transportation company or electronic network which enjoys the confidence and trust of the seller. Such an agency provision can allow goods to be released, delivered or shipped, to the buyer, promptly after receipt by the agent of the buyer-accepted first of exchange, permitting the first of exchange to be attached to goods being released, shipped or delivered or otherwise made immediately precedent to services being provided.

The invention envisages that a third party administrator TPA can administrate and co-ordinate individual or multiple transactions for a seller S or for multiple sellers S or buyers B, adding enhancements and efficiencies as a database history of credit and other relevant financial and trading information is developed.

In step 3 seller S notifies the institution capable of issuing a banker's acceptance, or a service intermediary acting on its behalf, designated FI/SI in the drawing that buyer B and seller S are about to enter into a transaction, at the conclusion of which, seller S will offer to exchange a trade acceptance TA for a pre-approved banker's acceptance.

In step 4, the acceptance-issuing institution, or its service intermediary, FI/SI, approves buyer B and the transaction. If the FI/SI does not pre-approve the transaction or buyer B, the transaction is aborted.

With the approval of the acceptance-issuing institution in hand, in step 5, seller S ships the goods to buyer B or supplies services to buyer B (or both), or otherwise releases the traded product, creating the triggering event which initiates the term of the first of exchange.

The triggering event of release, shipment or delivery of goods can be described by standard trade terms. These terms and others are defined in ICC INCO TERMS 1990, ICC Publishing S.A. International Chamber of Commerce (Paris, France) and successor documents, and include, but are not limited to, terms such as "EXW" ex-works, "FCA" free carrier at and so on.

In step 6, which should usually take place substantially contemporaneously with the release of goods or delivery of services in step 5, or within a couple of days thereof, seller S prepares and sends the invoice along with a second bill of exchange ("second of exchange" herein) to buyer B's bank.

The second of exchange preferably includes unique transaction identifiers and contains instructions to buyer B to pay on a date certain a sum of money to the account of the acceptance-issuing institution, under the same terms and conditions as the first of exchange.

The invoice is linked to the second bill of exchange, completing the process that allows for substitution of a banker's acceptance for a trade acceptance. B's bank holds both documents until buyer B signs and accepts the second of exchange, step 7, whereupon buyer B obtains the invoice to the goods or services, step 8. The date on which seller S released the goods or such other triggering event date as may have been agreed, will usually be made apparent from the invoice, and is used to establish a date certain for payment of the second of exchange, which date is entered on the second of exchange, prior to signing. The date certain is calculated by adding the term stated on the second of exchange to the date of the event described on the second of exchange. The date of the event can, for example, be the date of a transfer event, for example the date of transfer, or release, of the goods from the seller to a shipper. Such a transfer date can be determined from the transport document provided by the carrier, which document records the event of shipment, or receipt of the goods for shipment. The transfer event may be as specified with INCO-TERMS 1990. Since both the first and second of exchange have the same term which runs from the same event date, they also mature on the same date.

In step 9, B's bank holds the buyer-signed second of exchange to maturity when the bank debits B's account and remits cash to the appropriate party such as financial institution FI/SI, see step 13 hereinbelow.

In step 10, seller S furnishes to the FI/SI the buyer-accepted first of exchange received in step 2, along with evidence verifiable by the FI/SI, for example a paper or electronic document, of shipment according to the accepted pro-form a invoice.

The nature of the evidence of shipment of goods, delivery of services, or other event will depend upon upon the carrier or service provider and prevailing law or regulations, as will be apparent to those of ordinary skill in the art from time to time. Whereas certain paper documents such as waybills and bills of lading have traditionally been relied upon for verification of shipment, it may be expected that suitably authenticated electronic versions of these and other documents will become widely used and acceptable in the future for the purposes of the invention. Carriers or providers having electronic tracking and query capabilities are preferred to facilitate obtaining of the requisite event evidence, and to facilitate management of the process.

After such verification, the FI/SI issues, or causes to be issued and accepted, a bill of exchange drawn on the FI, the banker's acceptance. The banker's acceptance will have a maturity related to the maturity of the first and second of exchange, for example, 0, 7 or 14 days, up to about 30 days, or in unusual cases even 60 days, after the maturity date of the first and second of exchange.

In step 11, if a pre-transactional agreement has been made between seller S and the FI, as described above, and seller S has provided the necessary documents, for pre-acceptance, the FI will issue a pre-approved banker's acceptance quickly and routinely.

In step 12, the banker's acceptance, executed by financial institution FI/SI, is delivered to seller S. In step 13, which is optional, seller S can negotiate the pre-approved banker's acceptance for a cash instrument with one of many commercial banks or financial institutions who recognize the issuer's paper. The cashing institution becomes the holder H in due course of the banker's acceptance. If preferred, seller S can hold the pre-approved banker's acceptance until maturity and cash it with the issuing financial institution FI/SI.

The banker's acceptance is separately issued by the FI to seller S without recourse to seller S, less agreed fees, if any. In the event that buyer B does not pay the first of exchange or the second of exchange, the FI has no recourse to seller S in that regard. A banker's acceptance is an unconditional promise to pay at a future date. The FI holds the first of exchange as collateral for issuance of the BA. Upon collection of the first of exchange (second unpaid) or the second of exchange (first unpaid), the FI substitutes cash collateral less fees for the bill of exchange collateral underlying the issuance of the (pre-accepted) BA.

In step 14, upon the date certain, the buyer B's bank re-presents the second of exchange (first unpaid) to buyer B in the normal course of banking events and receives payment. By agreement between the buyer and the seller, or by treaty or banking practice, collection of the second of exchange may employ an electronic version of the draft rather than requiring a hard copy, or paper, document.

In the event of non-acceptance of the second of exchange, holder H of the first of exchange completes the documentation of the first of exchange by attaching the invoice and the shipping documents to the first of exchange, (second unpaid) and submits the previously accepted first of exchange to the buyer's bank for payment (second unpaid).

In step 15, upon presentation of the BA at its due date, the BA-issuing institution pays out cash to holder H, who may be the first or a subsequent holder in due course.

Figure 9:
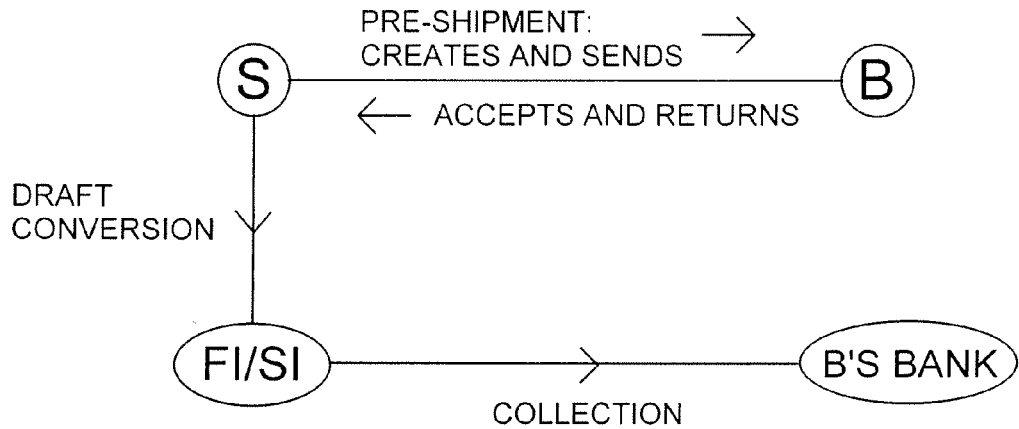
FIG. 9 is a flow diagram showing the movements of a first bill of exchange employed in the method illustrated in FIGS. 7-8.

FIG. 9 shows more clearly the life cycle of the first of exchange. It is created by seller S, and sent to buyer B for execution. Buyer B signs the first of exchange, indicating acceptance of the payment draft it embodies, and returns it to seller S. These steps are completed before seller S ships or releases the traded product. After releasing the traded product, seller S sends the buyer-accepted first of exchange to financial institution FI/SI requesting issuance of a banker's acceptance, which may have been pre-approved. When the first of exchange matures, financial institution FI/SI may or may not forward it to buyer B's bank for collection, along with proof of occurrence of the triggering event, e.g. shipment, or release for shipment. Payment of the first of exchange extinguishes the second of exchange.

Figure 10:
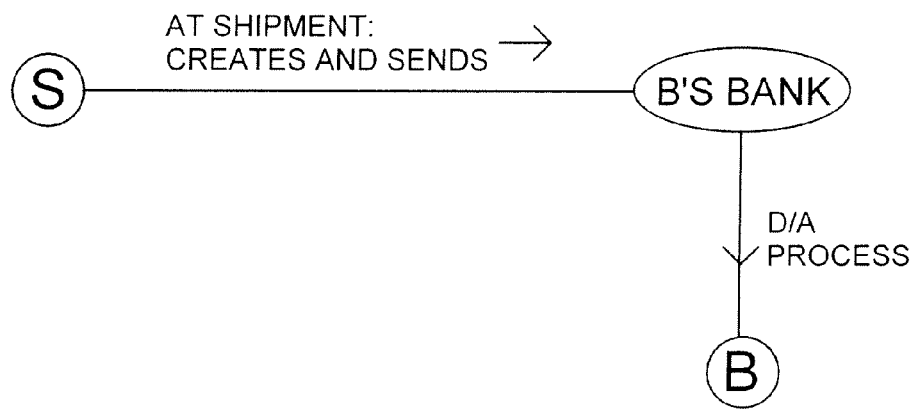
FIG. 10 is a flow diagram showing the movements of a second bill of exchange employed in the method illustrated in FIGS. 7-8.

FIG. 10 shows more clearly the life cycle of the second of exchange. It is created by seller S at the time of shipment with a date certain entered for its term, after the date of release of the traded product is known. The second of exchange is then sent to buyer's bank B along with the invoice. Buyer's bank B then attempts to obtain the buyer's acceptance of the second exchange against release to the buyer of the invoice which the buyer will need to clear the traded product from customs or to receive it from a carrier. This document-against-release process is described more fully hereinbelow. Bank B holds the buyer-accepted second of exchange until maturity, when buyer B's account is debited, thereby extinguishing the second of exchange. Because they are mutually extinguishable, the first is thereby automatically extinguished.

In the above-described process, the first bill of exchange becomes the collateral for the banker's acceptance, while the second bill of exchange is used in a more conventional way to effect collection of payment for the purchase from buyer B. Because the first and second bills of exchange are mutually extinguishable, payment of the second extinguishes the first, and vice versa.

Preferably, the first or second of exchange, or both, are embodied in a document which also contains, on its face, a transaction window 30, FIG. 6, reserved for information that includes unique transaction identifiers which enable the FI/SI to identify a transaction specifically. The transaction window, and the identifier information it contains, are preferably combined with the relevant bill of exchange instrument into a single paper or other hard copy document, in a manner which does not impair the character of the bill of exchange, preferably by occupying distinct and separate areas on the face of the document. It is preferred that the instrument of the bill of exchange be compliant with international treaty with regard to both form and content, one requirement of which is that the bill of exchange is a financial instrument ordering payment without reference to the underlying trade transaction. To this end, the transaction window can be visually or actually outside of the instrument of the bill of exchange or in an electronic sense, virtually outside the instrument of the bill of exchange. Thus, the first or second of exchange, or both, can be identified as transaction-specific without impairing their legal significance.

Holding the first of exchange as collateral for future payment, subject only to payment upon the due date of the tenor specified, the seller can be indifferent to the intermediate mechanisms of payment, since in practice the buyer pays once (drafts are mutually extinguishable) and seller is satisfied with payment in whatever form.

A further object of the invention is to provide trade financing methods and instruments which are amenable to electronic commerce. A difficulty in this respect is that traditional discounting mechanisms use endorsements in blank on the back of a bill of exchange to enable recognition of a holder in due course. Such endorsements are inherently technically difficult to capture electronically from a two-sided paper or other document, in a legally acceptable manner, because of the difficulty of proving the relationship between the front and the back of the document.

While other solutions may be known or may become known, and can be employed in the general method of the invention, a further, more particular aspect of the invention solves the problem of endorsement capture by providing a novel paper financial instrument suitable for electronic capture which instrument has a face which comprises a documentary area containing essential information that characterizes the instrument and a transaction window for transactional and historical information, the documenting and transaction areas being distinct one from the other. Payment draft 10, as shown in FIG. 6 and the bills of exchange shown in FIGS. 11A-11B (to be described hereinbelow) comprise three embodiments of such a financial instrument. Others will be apparent to those skilled in the art.

The information in the documentary area can comprise conventional financial information such as the text describing the instrument, the names of the parties to the instrument, an amount and terms of payment, but preferably the information is such as to characterize the instrument as a bill of exchange, and more preferably, as a first or second of exchange as described herein. By accommodating all necessary information on one face, and leaving the other face blank, such a paper instrument, is amenable to single-side scanning to provide electronically captured proof of collateral.

The transaction window can serve one or a number of purposes. For example, the transaction window can accommodate a unique transaction identifier, or more preferably, a compilation of unique alphanumeric identifiers that describe a transaction pertinent to the instrument, and preferably also, document the flow of the transaction. The flow of the transaction can be indicated by successive entries in the transaction window, listing for example identifiers for the seller and buyer, for the transaction for each document in the transaction, for shipping or other release events, for payment events, draft substitution events and so on.

Optionally, the transaction window can provide space and textual directives for one or more endorsements, by one or more successive holders in due course. Alternatively, a separate endorsement window can be provided, also on the face of the document and also in an area distinct from the instrument area, for such one or more endorsements.

By positioning all of the relevant tracking information on one face with the documentary information, in a transaction window, geometrically and visually outside of the instrument area, without intruding into the documentary area which defines or characterizes the financial instrument, the invention enables an image capture system to record all relevant information in a secure and technologically efficient manner. The resultant electronic instrument may be, or may become acceptable as proof or verification of the history and holders of the instrument. While the paper document should preferably maintain a clear, preferably geometrical, demarkation between the instrument and transaction areas, in the electronic realm the distinction may be real or virtual, and may be achieved in a number of ways, as will be known to those skilled in the art.

By this process the invention accommodates paper documentation which is presently required by treaty for trade between two different legal jurisdictions, while providing for efficient electronic tracking, recordal and archiving, and accommodating the probable eventuality that electronic documentation will become an acceptable practice, by law or private contract, for trade within a single legal jurisdiction, or for trade between different jurisdictions, especially between national or supranational, jurisdictions. To this end, the novel first of exchange, as described herein, preferably comprises sufficient data, in an appropriate formal arrangement, to comply with relevant national and international law, more preferably with relevant international treaties and practices.

When and if the UNCITRAL convention becomes operative, electronic evidence of release, shipment or delivery documents will become acceptable enabling the invention to be practiced largely electronically reducing or eliminating the need for paper documentation.

If desired the buyer and seller, can agree by private contract to allow electronic payment or drafting of the amount due, using an electronic data interchange format such as ANSI .X12 format commonly employed in the US, or an international standard EDIFACT message syntax or other such standard e.g. SWIFT, as may be convenient or appropriate.

The sample bill of exchange forms shown in FIGS. 11A and 11B embody the particulars described above including, on its lefthand side areas for entry of transaction identifiers and buyer information, which areas are distinct from the bill of exchange itself. In this case the buyer is an importer, and the seller is an exporter.

The term of the first of exchange shown in FIG. 11A is described as "60 DAYS AFTER EVENT (DATE)" with the intent that the name of the event, for example, release of goods, will be entered on the document, and the parenthetical item, which if a date, is the date generated when the specified event occurs.

The term of the second of exchange shown in FIG. 11B is described as "60 DAYS AFTER DATE (OF EVENT)". By the time the second of exchange is issued the event date will be known and can be inserted as the issuance date. The first and second of exchange have corresponding tenors from the same event, and therefore obtain the same maturities. Aside from this difference, and their dates of issue in the top right-hand corner, the two bills are identical.

The parentheses in the two bills of exchange bracket variable data that may be computer managed, for example from the document image workflow system, if employed. These variable elements functionally relate the documents to the computerized workflow system.

The pro-forma invoice shown in FIG. 11C comprises a cover sheet divided into an upper information section and a lower, agreement section. As labeled in FIG. 11C, the upper section sets forth basic information on the exporter issuing the pro-forma invoice, on the importer, on a bank of presentation, referenced as the importer's or buyer's bank herein, summary information regarding the pro forma invoice, the terms of sale, a ship-to location, carriage insurance information, information regarding import certification and import documents required, as well as an itemization of the pro forma invoice. The itemization can contain one or more traditional invoice lines setting forth quantity, description, price and extension of goods shipped, where the shipment comprises a small number of items, or it may reference an attached conventional pro forma invoice for more complex shipments.

The lower, agreement section of the cover sheet provides agreement paragraphs regarding merchandise claims, transportation, a limited power of attorney, change orders and a first blue exchange. Preferably, the importer-buyer is required to sign, date and accept each of the paragraphs individually, prior to the triggering event set forth in the first bill of exchange. In most cases, in practicing the invention, acceptance of the paragraphs regarding removal of merchandise claims from the payment cycle and payment of a first bill of exchange will be required, while the other agreement paragraphs are optional, but preferable. If desired or required, the seller, or the seller's agent, can also sign or otherwise indicate its assent to and authorization of the pro-forma invoice. It will also be understood, that where the financing process is buyer-initiated or controlled, the material elements and information in the pro-forma invoice can be incorporated in a purchase order or purchase order cover sheet with suitable changes.

The following tables provide non-limiting examples of information and agreement paragraphs that may be employed in the pro forma invoice when practicing the invention. The table headings reference the legends used in FIG. 11C to indicate locations where the table data may appear on the pro-forma cover sheet. It will be appreciated that the arrangement of data or data sections on the pro-forma invoice can be widely varied. Those of ordinary skill of the art will understand the abbreviations used and variations that may be made within the spirit of the event. It will also be understood that much of the variable data can be computer-generated from available databases or from other program procedures, for example, importer or exporter setup routines where the required information has previously been gathered or maintained. Curly parentheses, { }, indicate possible sources for required data items.

TABLE 1

| Exporter Information | | | |
|---|---|---|---|
| Exporter's DUNS #: | {D&B lookup} | Exporter named Party | {N.P. or contact} |
| Company {from exporter set-up} | | Address 1 {from exporter set-up} | |
| Address 2 {from exporter set-up} | | City | " |
| State/Province | " | Postal Code | " |
| Country: " | ISO Country code: " | Tel: | " |
| Fax: | " Email: | ' www. | " |

Of note in Table 1 is that the exporter information can be obtained from an exporter setup routine and includes a DUNS number.

TABLE 2

Terms of Sale

1. Payment: League of Nations Convention on Bills of Exchange 1930/31
2. Shipping terms: EXW loaded, INCO 1990
3. Governing Law: UN Vienna Convention on the International Sale of Goods (1980)
4. Merchandise Claims: not later than {cover ltr tenor} days after shipment.
5. Shipped under "Retention of Title"
6. Latest shipping date: /  /
7. IF Credit APPROVED: Documents against acceptance: Tenor:      days The terms of sale set forth in Table 2 include reference to international conventions for payment terms, shipping terms and governing law, as described elsewhere herein. Item 4 provides for a deadline for merchandise claims to be automatically posted from a cover letter, while items 6. and 7. provide deadlines for the seller to ship and prepare documents.

TABLE 3

Importer Information

Duns # {from importer set-up}     Attn:   {np from importer set-up}
Importer: {from importer set-up}     address "
address:                             city, unit, postal code     "
tel: "                 fax: "        Email: "

Similarly to the exporter information, the importer information in Table 3 can be retrieved from an importer setup routine and includes an identifier such as a DUNS number.

TABLE 4

Ship to:

Ship to: {from importer set-up}   Attn:    {customer fills in}
Warehouse: same
Address same                      city, unit, postal code: same
tel: "                fax:"       Email: "

The ship-to address in Table 4 can also be obtained from an importer setup routine, if desired.

TABLE 5

Pro-Forma Invoice Summary Information

PROFORMA invoice #: {fills in from doc}     Customer id: {on proforma (from accounts)}
DATE: {entered from proforma}               Amount: {entered from proforma}
Ship by date: {entered from proforma}

The pro-forma invoice summary information in Table 5 is obtained from the proforma invoice itself, which is either attached or embodied in the cover sheet, and may be automatically retrieved from a database generated in creating the proforma invoice.

TABLE 6

Bank of Presentation

BANK OF PRESENTATION {importer fills}
Branch:                  Contact:
Address 1
Address2                city,              unit,          postal code
tel:           fax:             email:

TABLE 7

Carriage Insurer Information

Insurance Company: {importer fills}         Policy #_____
Marine all risks: shippers load & count. Insurance at the cost and risk of buyer.
Enter here the customs (HS) code most applicable to these goods: _____

TABLE 8

Import Certifications

Import Certifications Required
ORIGIN(form)_____ Other_____

TABLE 9

Import Documents Required

Import documents required for customs clearance
Type:           __ InvoicePacking Lists    Other documents CERTIFICATE OF ___
Originals: no.   Copies: no.

The details required for the bank of presentation in Table 6, usually chosen by the importer, "buyer's bank B" as appropriate herein, for carriage insurer information in Table 7, for import certifications in Table 8 and for the import documents required in Table 9, are left blank, to be filled in by the importer.

TABLE 10

Pro-Forma Invoice Itemization

Harmonized System Code: Correct or amend HS numbers to reflect your classification.
Proforma Invoice Total from detailed domestic itemized Invoice attached, or single item listed below with
Harmonized System numbers (8 digits-required).
HS#__[enter]_____ description/part #      units  unit value  extension
HS#__{enter}_____ part #      units    unit value    extension
Item or Total value     $         Accepted{              Date"
{exporter duns from previous page}  {time date computer clock}  {importer duns from previous page}
{proforma invoice # from previous page} {total proforma invoice amount from.previous page}
{ship by date from previous page}

The pro forma invoice itemization section in table 10 provides for the details to be obtained from an attached invoice. Alternatively, details of a single line item invoice can be entered in the section comprised by Table 10. Provision is also made for the entry of Harmonized System numbers and for additional invoice and identification data to be posted automatically, as indicated by the data in curly parenthesis.

As may be understood from the description hereinabove, the invention provides, in a further aspect, a trade financing method wherein:

a) an originator creates a primary bill of exchange, chargeable to the account of a counterparty and activatable by a singular event occurring after creation of the primary bill of exchange; and

TABLE 11

Agreement Section Paragraphs

Merchandise Claims: In accepting this pro-forma invoice, the importer specifically agrees to recognize the Bill of Exchange as
a payment instrument under which payment is made as a financial instrument subject to the League of Nations Convention of
1930 (or successor treaties) which specifically excludes merchandise claims as a reason for non-payment, or a reduction in
payment, of the amount of the Bill of Exchange. The exporter and the importer mutually agree to accept the terms of sale as
stated, and to identify and settle merchandise disputes as a transaction separate and apart from the payment transaction, in
accordance with the UN CISG.
                                                                           Accepted:        DATE
Transportation: As the owner of the goods, ex-works loaded, the importer will specify with the power of attorney below(or
leave blank), a door to door, multimodal transportation company, with its own offices in both the country of exportation and
country of importation, shipping the goods at the account and risk of the importer, such that the transportation of goods is
covered by one waybill only on a door to door basis, and with a transportation company that has electronic tracking capability
such that the carriage and the delivery of the goods can be monitored and established (including proof of delivery) by electronic
means. In the event that the importer does not wish to select such a carrier, a blank limited power of attorney will enable the
exporter, or TFSC on behalf of the importer, to use their best efforts without obligation to select a carrier that meets the above
criteria who is willing to undertake carriage of the goods at the expense of the importer.
                                                                           Accepted:        DATE
Limited POWER OF ATTORNEY (required in order for documentation to be completed in the US on your behalf)
You authorize (agent/forwarder/carrier or leave blank)_____ to act as forwarding agent for you for
Export Control, Census Reporting, and Customs purposes. If you have no permanent residence in the United States, you also
authorize Trade Finance Service Corp./forwarder/carrier)_____ to accept service of process issued by the Department of
Commerce, Department of Treasury, or any other Federal Government Agency or Court addressed to you and you consent to
personal jurisdiction and venue of any Federal Court or administrative tribunal in the United States. You hereby certify that all
statements and information contained in the documentation relating to exportation are true and correct. Furthermore, you
understand that civil and criminal penalties, including forfeiture and sale, may be imposed for making false or fraudulent
statements or for the violation of any United States laws on exportation, including but not limited to 13 U.S.C Section 305, 22
U.S.C. Section 401, 16 U.S.C. Section 1001, and 50 U.S.C. App. Section 2410.
So agreed by agreement and acceptance signed below.
                                                                           Iinitial here____ date____.
Change Orders: Changes to this transaction can be made up to the time of shipment by the exporter issuing and the importer
accepting a new pre-export proforma invoice with a covering PEPI and first Bill of Exchange attached as herein specifying the
terms of the new transaction. By mutual agreement, these documents may be exchanged by fax between fax machines regularly
used in the normal course of business and listed herein. Also by mutual and explicit agreement faxed documents which appear
on their face to have been signed by either party shall be considered for the purpose of this and the changed transaction as
manual signatures so that any and all rights and obligations accruing to this document covering a particular transaction shall in
the same way accrue to a subsequent transaction modify this transaction. The importer identified above, and signing this
document explicitly agrees not to challenge a faxed signature on a bill of exchange which on its face appears to have been signed
to modify the initial transaction.
                                                                           Accepted:       date:
First Bill of Exchange: The First Bill of Exchange shown below, represents a commitment to pay the First of Exchange (second
unpaid) when accompanied by shipping documents and/or to accept the Second Bill of Exchange which will be issued with the
invoice on shipment date. Upon acceptance of the second of exchange, the import documents will be released. Upon the payment of
the Second Bill of Exchange, the First Bill of Exchange is extinguished. Upon non-acceptance of the First Bill of Exchange the
transaction will not be entered into. For non-acceptance of the Second Bill of Exchange, an instruction for protest has been issued,
and the shipping documents with the First Bill of Exchange (accepted) will be presented for payment. Non-payment will be
protested.
You must sign and date the proforma invoice attached and the space marked "ACCEPTED" on the document below to initiate
this transaction. You may fax this document and the signed proforma as an advice of acceptance, however, the transaction
cannot be officially entered until the signed document is received in the mail.

b) a further party subsequently issues, in exchange for the first bill of exchange, a substitute bill of exchange chargeable to the account of the further party.

Typically, the originator and the counterparty have planned or contemplated for the event to take place after creation of the primary bill of exchange, preferably, after execution of the primary bill of exchange by the counterparty. The event can, for example, be a commercial event such as a purchase of a product from the originator by the counterparty.

In a particularly preferred and advantageous embodiment of this aspect of the invention, the originator and the further party arrange pre-acceptance of the exchange of the substitute for the first bill of exchange to facilitate the exchange process.

Preferably, but not necessarily, the further party is of substantial financial repute so that the method provides credit enhancement whereby the substitute bill of exchange is more readily negotiable than the primary bill of exchange. The first bill of exchange can be a trade draft issued by a buyer and activatable by release from a seller of a traded product purchased by the buyer by delivery of the product or activatable by such other event relating to the purchase as may be agreed by the buyer and seller. The second bill of exchange can be a banker's draft which is exchanged by the seller for the trade draft.

The process can be managed by software implemented on a suitable device, for example a computer, and the software management process may itself provide credit enhancement.

The invention in this aspect distinguishes from a conventional bill of exchange, in that the primary bill of exchange is created prior to the event which provides the consideration for the primary bill of exchange and in that the term of the bill of exchange is linked to the event. Thus the primary bill of exchange is effectively dormant, or inactive until the event occurs.

Sending the bill of exchange from the originator to the counterparty amounts to a demand for payment which calls upon the counterparty to pay upon receipt, or to accept the demand for payment. Preferably, the counterparty pays (in the former case) or in the latter accepts the demand for payment by signing the bill of exchange "accepted" and returns same to the originator, or the originator's agent as evidence of acceptance. If desired, the counterparty may be authorized to create the bill of exchange on behalf of the originator through the agency of a limited power of attorney.

If desired, the third party administrator TPA can manage the process by which the payment between the parties to the first and second of exchange is applied to the payment process between the parties to the pre-accepted banker's acceptance. The details of such payment process can be noted on the bills of exchange in the information areas outside the bill of exchange area of the document.

The invention can be employed to finance a series of transactions creating a series of bilateral situations using pre-approved bills of exchange which demonstrate a willingness to pay, and then credit enhancing, using either the third party administrator TPA, or an outside agency, to demonstrate ability to pay. The steps of demonstrating willingness to pay followed by ability to pay are preferably effected on a transaction-by-transaction basis.

The invention extends to the novel instruments disclosed herein, including a pro-forma invoice endorsed or otherwise modified as herein described, the first and second of exchange, both severally and jointly and the pre-approved banker's acceptance. The invention further includes computerized, or other electronic or automated systems and software for implementing one or more steps of the described methods.

It will be understood that traded product traded with the assistance of the methods, instruments and systems of the invention can be substantially any suitably valuable good or service. However, the invention is contemplated as being particularly useful for trading manufactured products, for example, without limitation, machinery, hardware, foodstuffs, books, recordings, electronic equipment and information products and software stored on physical media, and so on.

As referenced above, although not so limited, the invention is particularly applicable to international trade between different nations or jurisdictions having differences in law, currency, culture or business practices, or simply being so geographically separated that other methods of trade financing are unduly difficult. Thus, the invention can be employed to facilitate export or import from or to the United States and other countries or regions, for example, Japan, Europe, Australia, Latin America and so on. While there is of course no particular size or volume limitation to any trade transaction that may be facilitated by the invention, it is believed that there is a great body of import-export transactions having values of the order of ten or more thousands of dollars, up to several millions of dollars, many of which are effected by small to medium-sized manufacturing and production companies which will gain especial benefit from the novel financing methods, instruments and systems of the invention.

In another aspect, the invention provides a trade finance management system for managing and tracking the trade finance methods of the invention. Preferably, the system is computer implemented and employs novel software to perform its functions. The trade finance management system can be operated by a third party administrator TPA, and can have selected modules distributed or otherwise made available to the parties to the trade finance method to enable such parties to participate in individual aspects or steps of the method, as required. Webbed network communication between the document image software and its distributed modules (or programs) running at the several parties respective computer stations enables real time monitoring and co-ordination of the process. Webbed network communication can be effected via the Internet, an intranet or intranets or other suitable WAN, or even a LAN. Preferably, the system modules provide only such access and functionality as are needed by an individual participant to complete their role in a transaction, to ensure confidentiality. Such controlled access may be provided by a suitable multiple password system which gives all the parties to the transaction the ability to see at their own place of business that portion of the transaction in which they may have a financial interest while maintaining confidentiality with respect to other portions.

As referenced above, the invention can employ document image workflow management software operating through distributed applications, communicating via a LAN, the Internet or other WAN, or other suitable network architecture, to manage data entry, document creation and tracking, transaction tracking, contact management and other facets of the workflow process. Generally the software is made available to the appropriate parties to the transaction that have data to enter, although provision can be made for technically unsophisticated parties to participate without use of a computer. Preferably, the trade finance process manager, if employed, also manages data entry. The document image workflow software is preferably intelligent and has high-level functionality to enhance the trade finance process. For example, the document image software can allow certain documents to be stored and pledged as collateral, and that collateral to be available to interested parties to a transaction, to provide asset-based lending.

As described above, the pre-approved bill of exchange of the invention evidences time-specific willingness of the buyer to pay and the buyer's ability to pay can be evidenced, if desired, using an outside agency, which may optionally provide "credit enhancement". The combination of willingness to pay and ability to pay create collateral value in the pre-approved bill of exchange which is enhanced by the buyer's signed statement of intent to pay.

The invention enables a lender, or other authorized party, to monitor the status and development of that collateral through networked use of the trade finance management system.

A wide variety of optional features can be added to enhance the trade finance method of the invention and, in some cases, the new financial instruments disclosed herein. Such optional features can, in most cases, be computer-implemented or facilitated employing the trade finance management system of the invention. Some such optional features will now be described, using by way of illustrative example, the case of a seller exporting from the United States to a foreign jurisdiction. The exemplary case of a buyer importing to the United States will also be referenced. Those of ordinary skill in the art will understand that the invention can be similarly employed by buyers and sellers in other nations, regions or jurisdiction, in an equivalent manner, with suitable modifications to allow for differences in law, practice and culture. Other optional features, alternatives and equivalents will also be apparent to those skilled in the art, based upon the teachings described below and elsewhere herein.

Trade acceptance to banker's acceptance. In a simpler embodiment of the invention wherein a buyer executed trade acceptance is converted to a banker's acceptance, but there is no pre-acceptance agreement with the FI/SI, a collection is made on the first and second bill of exchange, without a banker's acceptance payment by the collecting bank. The process through the issuance and acceptance of the first and second bills of exchange, steps 1-7 of FIGS. 7-8, remains the same, with the difference that the first and second bills of exchange are made payable to the order of the exporter rather than the FI/SI. Such a process and the financial instrument it generates, suits cash-rich exporters not financing work in process, or exporters whose banks will lend against credit-enhanced foreign receivables.

A third party administrator TPA administering or facilitating such a method can obtain payment by drawing an accepted draft for its fees at the time of export with a term expiring shortly after the due date of the $2^{nd}$ bill of exchange, for example, 10 days thereafter. Alternatively, the seller-exporter S can draw a draft on themselves, accept it, and send the accepted draft to an authorized representative of seller S who may sign it where the exporter signs on the $2^{nd}$ Bill of exchange. This will then be lodged with the bill-of-exchange collecting bank for collection. This procedure is relatively expensive as a transaction cost, but enables the trade finance process manager's fees to be collected via a bill of exchange issued by the exporter, rather than employing invoices which may go through an accounts payable process and be referred back to an export department.

Standby Letter of Credit for Exporters.

As part of a set-up procedure for exporter-seller, it may be desirable, or the acceptance-issuing bank (the FI/SI) may require the seller to accept some risk retention in the export process. One useful form of risk retention in a financing process comprising a series of individual transactions is for the buyer or seller to furnish a standby letter of credit payable to the FI/SI for a small portion of the value of the transaction series, for example, the value of a maximum of one outstanding transaction in the series.

When such a letter of credit is employed as bank credit enhancement in the trade finance method of the invention, then US standby collateral for merchandise claims can be provided in a number of convenient ways, for example by a series of pre-approved drafts which may optionally be correlated in time and value with the series of transactions whereby each draft relates to a transaction and is drawn for a suitable portion of the value of the respective transaction.

The limited power of attorney between the FI/SI and the exporter, if employed, can call for a debit note from the FI/SI to be issued to the exporter to reflect any shortfall in payment (besides collection fees) arising from a merchandise claim, or, possibly, from non-insurability due to inadvertencies such as shipment to a non approved location. Pursuant to the agreement, issuance of the shortfall debit note by the FI/SI should trigger payment.

If desired the pre-approved drafts can be credit enhanced and made out in favor of the acceptance-issuing bank. Some other optional features of such claim standby drafts are that they be due a short time, e.g. 7 days, after a debit note date and that they be established by agreement with the FI/SI as part of the payment relationship.

Imports into the U.S. with Limited Retention.

In an alternative embodiment of the invention, the FI/SI can finance imports into the US on a divided payment basis with the foreign exporter receiving a major proportion, for example 70-90 percent, of the proceeds as a pre-approved banker's acceptance, and the balance being a retention. The pre-approved banker's acceptance preferably has a maturity dated somewhat beyond the import transaction terms, for example 30 days later, and could be issued by a US-based bank at US banking interest rates. The collateral would be a credit-enhanced US receivable. The money transaction would be between the foreign exporter's bank, or service intermediary and the acceptance-issuing bank. Preferably, the third party administrator TPA could electronically track and document the transactions and manage the money, but neither handle nor have control of the money.

The retention, which in the above example would be 10-30 percent of the value of the import transaction, can be handled by the third party administrator TPA who may obtain its fee from the retention and remit the balance of the retention to the exporter, when there is no longer a possibility of merchandise claims being made. The trade finance management system can enable the third party administrator TPA using document imaging software to manage the process in the acceptance-issuing bank from their own remote office using multiple level password protection, or other means to assure both limited access and confidentiality.

According to a further feature of the invention, one way of managing merchandise claims that have been, or are to be, removed from the payment cycle by agreement, is for the U.S.-based exporter-seller to pre-agree with the foreign importer-buyer to hire an outside merchandise claims adjusting company to adjust any merchandise claims that may arise and to abide by their findings. Alternatively, the exporter and importer may agree to hire a pre-shipment conformity assessment company to issue a certificate of conformity of the shipment with the actual or pro-forma invoice. Usually, both risk mitigation steps are charged to the expense and risk of the exporter who also is responsible for the third party administrator TPA's fees.

To facilitate the process, the importer can pre-agree to limit merchandise claims to a small proportion of the value of the shipment, for example less than 20 percent, or to bear the cost of conformity assessment in order to retain the right to make a claim for more than say 20 percent. Importers with frequent or excessive merchandise claims are not attractive credit risks.

In either case, merchandise claims are outside the payment mechanism by treaty and by contract as specified in the underlying contract with both the exporter and the importer. In the preferred methods of the invention, both the exporter and the importer recognize by contract that their payment drafts or bills of exchange, are governed by international treaty, for example the 1930 League of Nations or UNCITRAL.

Preferably, the exporter and importer also agree to use carriers with electronic shipment tracking capabilities, and to allow the third party administrator TPA to monitor the goods in transit.

Trading Company Process.

In the case of an importing or exporting trading company expediting shipments for a manufacturer, and which is neither a manufacturer nor the ultimate user or distributor of the traded product, it is probable that the acceptance-issuing bank will require transaction risk retention, and backup or standby collateral from the supplying parties to the transaction.

Conventional financing methods employ either the difficult and unattractive letter of credit process or require the manufacturer to await collection of the invoice, at term, after shipment, which may be several months. The methods of the invention can be used to enable a manufacturer selling through a trade intermediary to be paid promptly after shipment, from the proceeds of a pre-approved banker's acceptance. Provided that the trade intermediary is willing to wait for all or part of their money until the collection of payment from the buyer, in the second of exchange or first of exchange process, the banker's acceptance can be issued on behalf of the trade intermediary, in favor of the manufacturing supplier in the manner previously described for the seller. Using this practice, a major proportion of the transaction value, for example up to about 85 percent, can be paid to the manufacturer and, depending upon the particular arrangement between the manufacturer and the trade intermediary, it is possible that this proportional amount of the invoice value may be adequate fully to reimburse the manufacturer for his share of the transactional, the balance, for example 15 percent, being the profit due to the trade intermediary.

In certain such cases, a standby letter of credit from the manufacturer, or from the trade intermediary, or letters of credit from both, held by the the acceptance-issuing institution, may be helpful, or required, to provide backup collateral or credit enhancement. As contemplated herein, provided that a suitable triggering event can be agreed and specified in the financial instruments, the invention can flexibly employ standby letter-of-credit credit-enhancement, or other standby mechanisms, if desired, to improve the quality of those financial instruments.

A further possible requirement is for the trade intermediary to have, in his collateral pool, accepted bills of exchange from the manufacturer to back the call for support on merchandise claims. Employing the document imaging workflow management system described herein, the acceptance-issuing bank, the third party administrator TPA and the trade intermediary, can all see and manage the collateral.

Draft Substitution Process with Letter-of-Credit Based Credit Enhancement.

For those instances where there is no alternative but to use a letter of credit, it would be desirable, in the method of the invention, to provide a system capability to an exporter to assist the importer to initiate a letter of credit while using the trade finance management system, for example in steps 1 or 7 of FIGS. 7-8, the cost being borne by the importer.

Draft Substitution Process with Avalized Enhancement.

Where credit insurance cannot be obtained for a foreign importer (foreign to the United States, that is), alternative credit enhancement processes can be employed. One example of such a process employs an aval, or guarantor of payment for the transaction. Preferably, the avalor is insured, for example by the third party administrator TPA, not so much against risk of default, but to keep the claims process coherent. Preferential insurance rates will usually be available on avalors. Other, equivalent processes for providing credit enhancement will be apparent to those skilled in the art.

The cost of the aval would be born by the importer, and the avalor would be responsible for determining their willingness to avalize any one importer. This function can easily be processed electronically, for example by implementation of the TPA workflow system between the avalor and the TPA. It is possible that the avalor could also be the correspondent bank on the importer's export transactions.

Language.

The document imaging workflow management system screens can be produced in any desired language, and the document form can be output in any pre-determined language. For example, the system need not necessarily be setup and output in the same language, e.g. English, but could be set up in Arabic, and output in either Arabic, English or German, and vice versa. Preferably, the contents of a document field are not translated however, but are in the language of the inputting country, or in English, being a common keyboard business language.

As referenced above, the novel methods and instruments of the invention can be implemented in software, and the invention further provides novel trade finance software for that purpose. In preferred embodiments, the trade finance software comprises a number of modules adapted to the different needs of the several parties to a trade finance transaction or to a series of transactions.

Figure 12:
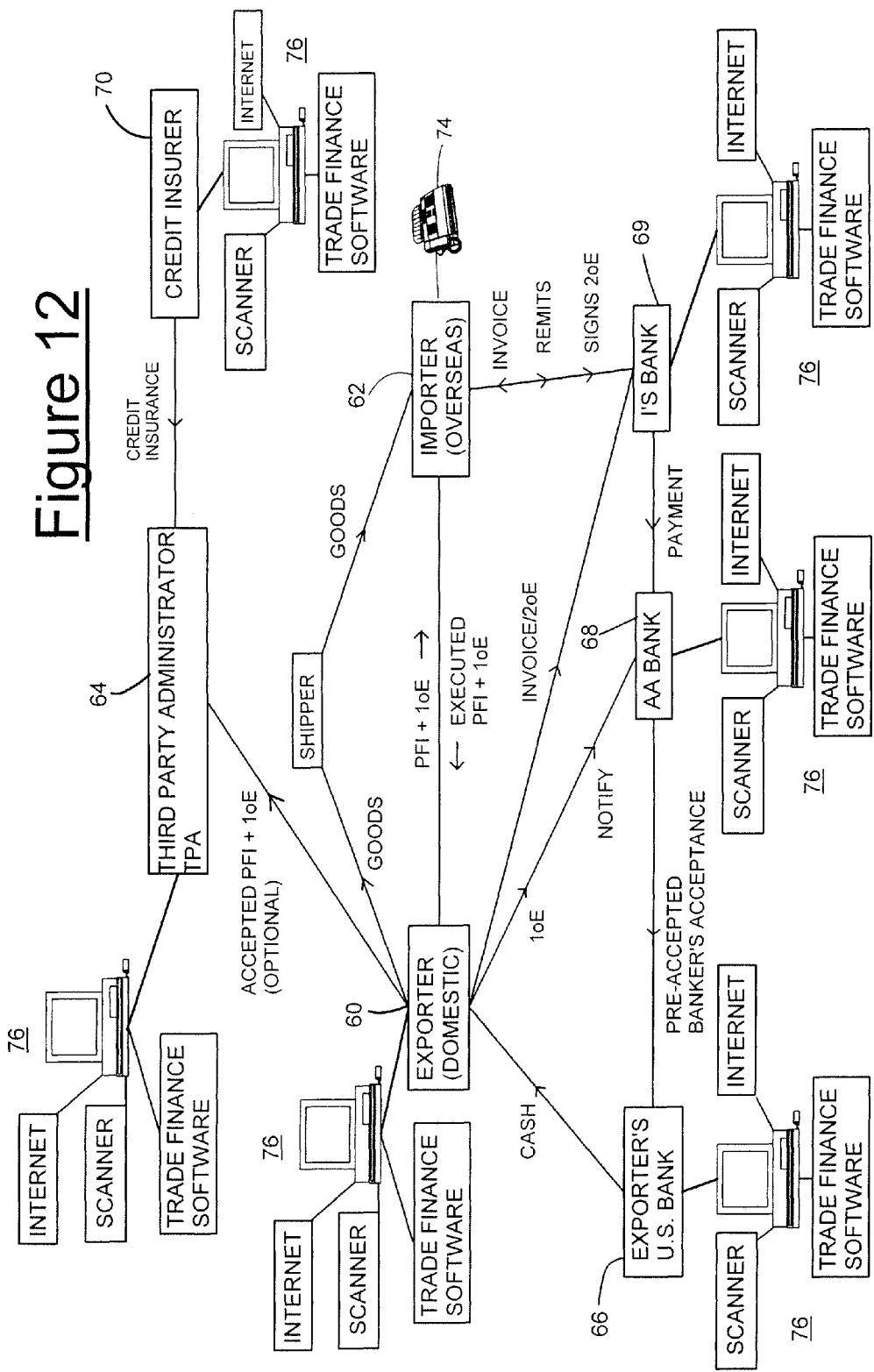
FIG. 12 is a schematic block diagram illustrating the functional relationships between the parties in an export trade transaction financed according to the method of FIGS. 7-8, with optional computer-implementation.

Referring now to the schematic block diagram of FIG. 12, there is illustrated the process flow of an embodiment of the trade finance method of the invention as it might be implemented between an exporter 60 domiciled in the USA, an importer 62 domiciled overseas, a third party administrator TPA 64 probably, but not necessarily, domiciled in the USA, the exporter's U.S. bank 66, an AA Bank 68, importer's bank 69 and an insurance company 70.

In the preferred embodiment shown, importer 62 is equipped with a fax machine 74, while exporter 60 and third party administrator TPA 64, as well as banks 66, 68 and 69 and insurance company 70, are shown as being equipped with a computer system 76. Also as shown, computer system 76 comprises a desktop system unit, a suitable trade finance software module, a document scanner for reading paper documents and, optionally, for importing them into electronic files, and a WAN connection for electronic communication with one or more of the other parties shown. Preferably, the software modules are adapted to the different needs of the different parties, as will be explained in more detail below. In many instances, depending upon the functionality desired, the scanner can be a fax machine, or internal fax board, and a preferred WAN connection is to the Internet, which connection may be effected via a LAN or intranet. Clearly, other system units can be employed, for example laptop, palm-top, floor-mount units and so on.

The system is designed to permit an overseas importer to participate fully in the documentary workflow process, without requiring a computer, providing their input via fax, telephone, mail or equivalent. The system can provide a similar advantage to a U.S.-based importer buying from one or more overseas exporters, some of whom may have less technologically sophisticated facilities, yet who can fully participate in the methods of the invention without needing a computer or Internet connection. However, at such time as a computerless participant becomes computer-enabled, preferably with an Internet connection, they can participate electronically, further enhancing the process with time reductions and the like.

In general, it is desirable to avoid having to supply proprietary software to an overseas party to the transaction, although, in certain cases, this may be done. For example if a long relationship is anticipated with the overseas party, or a series of transactions is contemplated, a transaction is particularly complex, or simply if the overseas party prefers or is willing to computer-implement their role in the transaction.

Also, in general, it is preferred that the seller's role be computer-implemented, because as set forth in the preferred aspects of the invention, the seller will usually play the greater role in the preparation of documents. However, it will be understood that these considerations could be reversed, especially for a sophisticated importer in a major industrial country obtaining supplies from a number of technologically less sophisticated overseas exporters.

In such case the importer may play the major role in the process and be equipped with a trade finance software module. Such a sophisticated importer may also generate one or more purchase orders embodying the relevant sales agreement terms, as described herein, rather than pro-forma invoices.

Similarly, banks 66, 68 and 69, and credit insurer 70 are shown as computer-equipped because such institutions will usually be computer equipped, it is nevertheless possible, but less preferred, for them to participate in the process of the invention, without computer-implementing their role.

Where a third party administrator is employed, it is strongly preferred that such administrator computer-implement their role and assume a significant role in document preparation. Nevertheless implementation of the process of the invention can be facilitated if an exporter, or possibly an importer, domestic to the third party administrator also computer-implements their role. Thus, as between the buyer and seller, it is a notable feature of the software-implemented process of the invention that only one of the parties to the transaction need be computer-enabled. This feature is a significant advantage over processes requiring computer participation by both parties. Because of its flexibility in this respect, widespread deployment of the invention does not depend upon the creation of a critical mass of computer-literate import or export traders.

It will also be understood by those skilled in the art that the trade finance method of the invention can be computer-implemented using, as an alternative to the trade finance software modules described herein, off-the-shelf software applications for document preparation and communication, for example word processor or office suite packages, or available forms processing or document imaging applications and known network or other communications software. Furthermore, such off-the-shelf applications may have capabilities enabling them to be adapted to provide a trade finance software module according to the invention herein and the invention includes such adaptations of off-the-shelf packages.

It will be appreciated, by those of ordinary skill in the art, that the equipment shown is merely suggestive and that the several parties may have other equipment additional to, or in place of, that shown which they employ to participate in the trade finance process of the invention. Also, alternative communication modes to a WAN may be employed, for example modem connection via the telephone network and that the scanner is merely suggestive of an input device that can be used to interpret hard copy documents or other information objects into a suitable electric electronic form for computer input. Each computer is also equipped with such peripherals as are customary or desired, especially a suitable high-quality printer for outputting documents usable as financial instruments.

The trade finance software module is preferably a customized proprietary module designed to implement the method and instruments of the invention and it includes suitable screens, screen devices, data retrieval, data entry means and programme procedures and features to effect those steps of the methods described herein as are computerizable and also to create the documents and instruments described herein. The software modules are stored in computer media at the individual stations, as is known to those of ordinary skill in the art, for example on hard drives of the respective systems for loading into RAM. The software modules can be distributed by CD-ROM, diskettes, remote downloading or other means known to those skilled in the art. When loaded to computer RAM, the trade finance software modules provide a customized trade finance business machine. The system depicted in FIG. 10 provides a plurality of such machines cooperative with one another to facilitate or perform the method of the invention.

Preferably, the computer modules can talk to one another using Internet protocol or other suitable wide area network format. However, since Internet and other WAN communication is in essence, usually a non-confidential broadcast of information, it is preferred that sensitive data be suitably encoded and transmitted in their non-broadcast format, for example by file transfer using FTP or the like.

Preferably, each party's software module provides only so much program capability and data access as is appropriate to that party's role in the transaction. Though shown communicating only with exporter 60, importer 62 and insurance company 70, third party administrator TPA 64 can by agreement also communicate with and be privy to relevant transaction activities at exporter's U.S. bank 66, AA bank 68 and importer's bank 69. Third party administrator 64, and possibly also exporter 60, can be, and preferably is, the only party who sees all facets of the trade transaction and its financing.

Systems such as that shown schematically in FIG. 12 can be used to implement financing methods such as, or generally similar to, that described with reference to FIGS. 7 and 8. A preferred method commences with an exporter 60, who might be seller S in the method shown in FIGS. 7 and 8, preparing and issuing a pro forma invoice PFI and a first of exchange 1oE, and sending the documents to the overseas importer 62, buyer B in the method shown in FIGS. 7 and 8, optionally, with the assistance of third party administrator 64. Use of third party administrator 64 to facilitate the method of the invention is particularly preferred for the coordination, control, experience and history records that third party administrator 64 can bring to the process. In particular, it is furthermore preferred that third party administrator 64 uniquely identify the exporter 60 and importer 62, employing a recognized third party code, for example a DUNS No., a proprietary number created and maintained by Dun & Bradstreet, for which purpose third party administrator 64 may have an online or Internet connection with Dun & Bradstreet, or a comparable organization. Alternatively, other unique identifiers such as a tax identification number or company registration number may be used. Where no such identification code exists for the exporter or importer, third party administrator 64 can complete the process of issuing a new code on behalf of the exporter or importer.

Preferably also, the pro-forma invoice and 1oE documents are prepared electronically, and they can also be transmitted to importer 62 electronically. However, at present, it is preferred that the buyer-executed documents be hard copy paper documents originals of which are returned to exporter 60 by mail or courier. However, it is contemplated that fax signatures may soon be acceptable, even for the transaction-initiating documents, and the invention accordingly includes methods wherein executed documents are transmitted by fax.

As discussed hereinabove, at a future date, electronic or equivalent authentication may be acceptable permitting electronic communication of the documents, or a faxed signature may be acceptable.

If desired, third party administrator 64 can obtain credit insurance, to enhance the collateral in the 1oE, from insurance company 70. In many cases, obtaining credit insurance on the importer will avoid the need for other collateral or credit enhancement, such as a letter of credit.

In due course, after receipt of the executed pro-forma invoice and 1oE, exporter 60 releases the goods to a shipper and forwards the 2oE and the invoice to importer's bank 69. In return for importer 62's signature on the 2oE, his bank 69 releases the invoice to importer 62, enabling importer 62 to to clear the goods from customs. This process is an example of what is sometimes called a document-against-acceptance process, often abbreviated "D/A" in the banking industry, in which the invoice document is released by bank 69 against importer 62's acceptance of the 2oE indicated by importer 62's signature on the 2oE. Again, at the present time it is preferred that both the executed originals of the 2oE and the invoice be paper documents. However, the signed originals can be electronically scanned providing an electronic record of execution of the documents, quickly indicating progress of the transaction and possibly also providing electronic evidence that may be acceptable as proof of such progress. Since the process is secured by the 1oE, it may be fully electronic third party administrator can capture the details of the 2oE as they are created, employing the desktop workflow document image management system described herein, as they are scanned or faxed.

Exporter 60 then submits evidence of the issuance of the 2oE along with verification of shipment, or of release of the goods to the shipper, in paper or electronic form, as required, to a bank 68 with whom exporter 60 has previously executed a draft substitution or conversion agreement. In the event of non-acceptance of the 2oE, which non-acceptance can be notified through the banking system's mechanism for reporting exceptions, the collateral represented by the 1oE enables a hard or electronic copy of the 1oE to be presented for payment, along with evidence of its activation, to the importer's bank.

Pursuant to the draft substitution agreement, bank 68 promptly issues a pre-approved banker's acceptance, which exporter 60 can readily cash at his bank 66. At or before maturity of the 2oE, bank 68 collects a remittance from importer 62.

Because the 1oE exists as collateral, requiring only the physical waybill to trigger it, the draft substituting bank, the FI/SI, can rely on the dispatch of the 2oE to issue substitution documents because the goods are effectively prepaid and there is a mechanism within the banking industry's for document-against-acceptance terms to report non-acceptance or non-payment.

Figure 13:
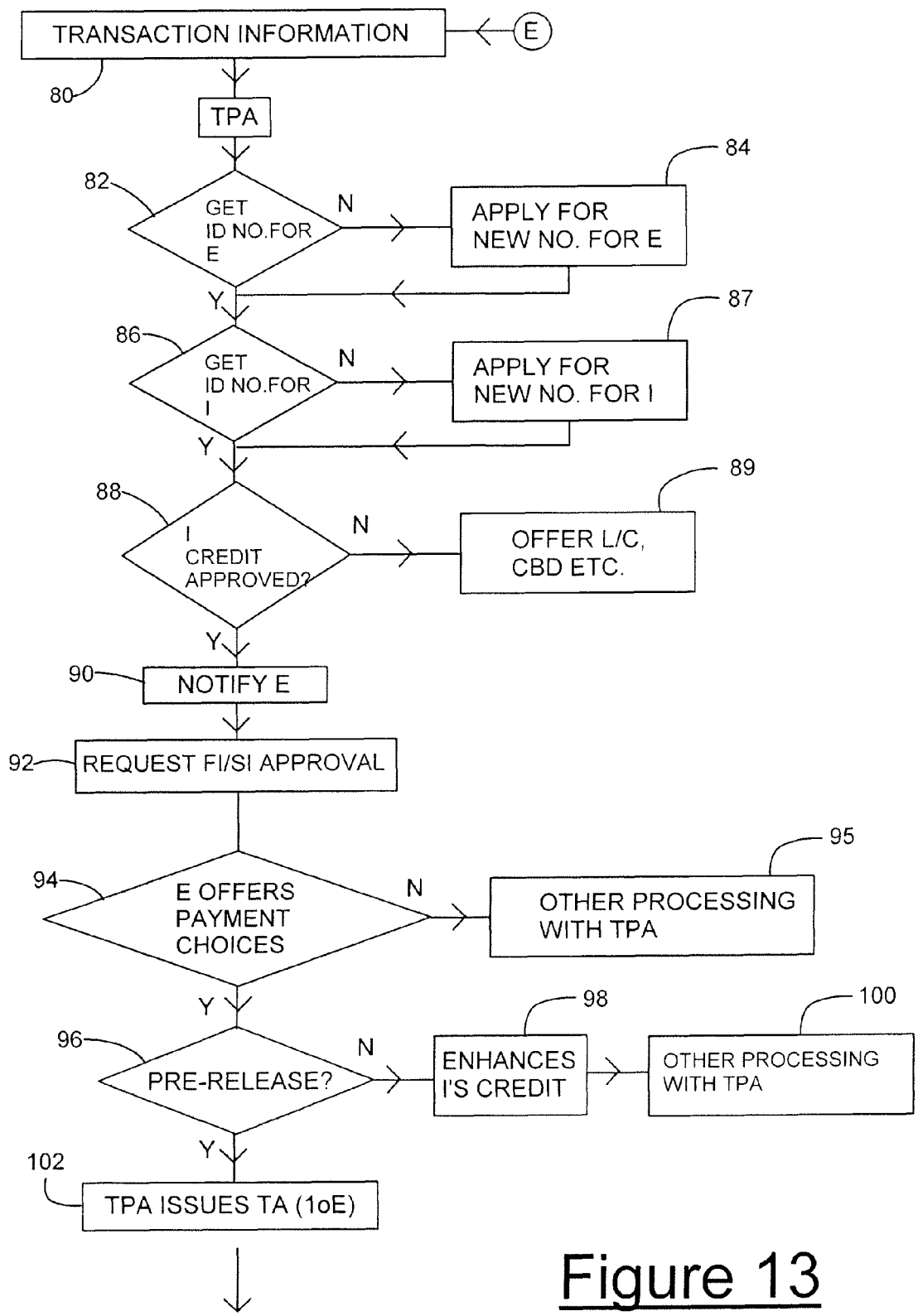
FIGS. 13, 14 and 15 are partial views, to be read as one, of a block flow diagram of a illustrating the process flow of another embodiment of a computer-implementable trade financing method according to the invention, for financing import-export transactions between an exporter E and one or more importers I, with the assistance of a third party administrator TPA.
Figure 14:
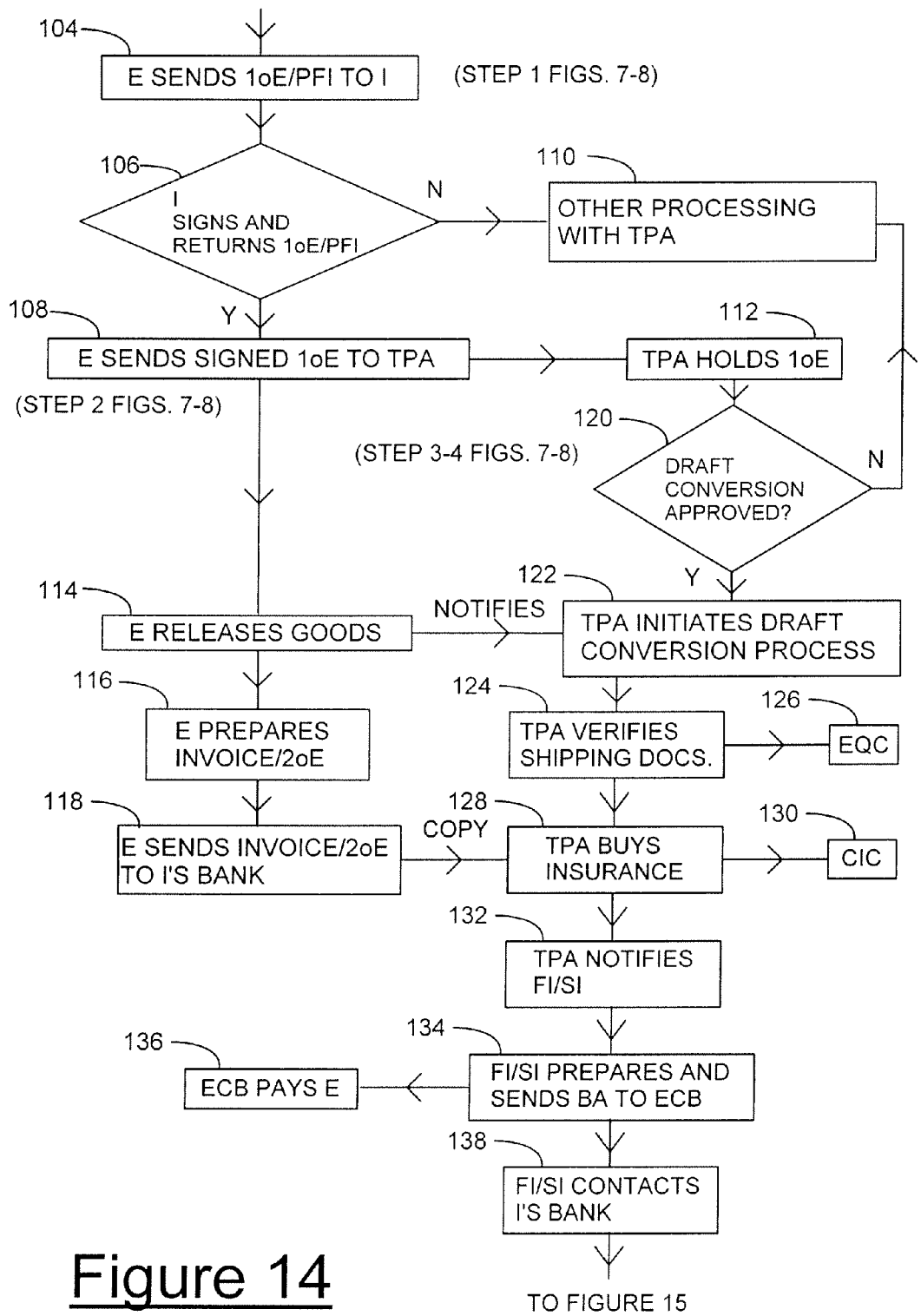
Figure 15:
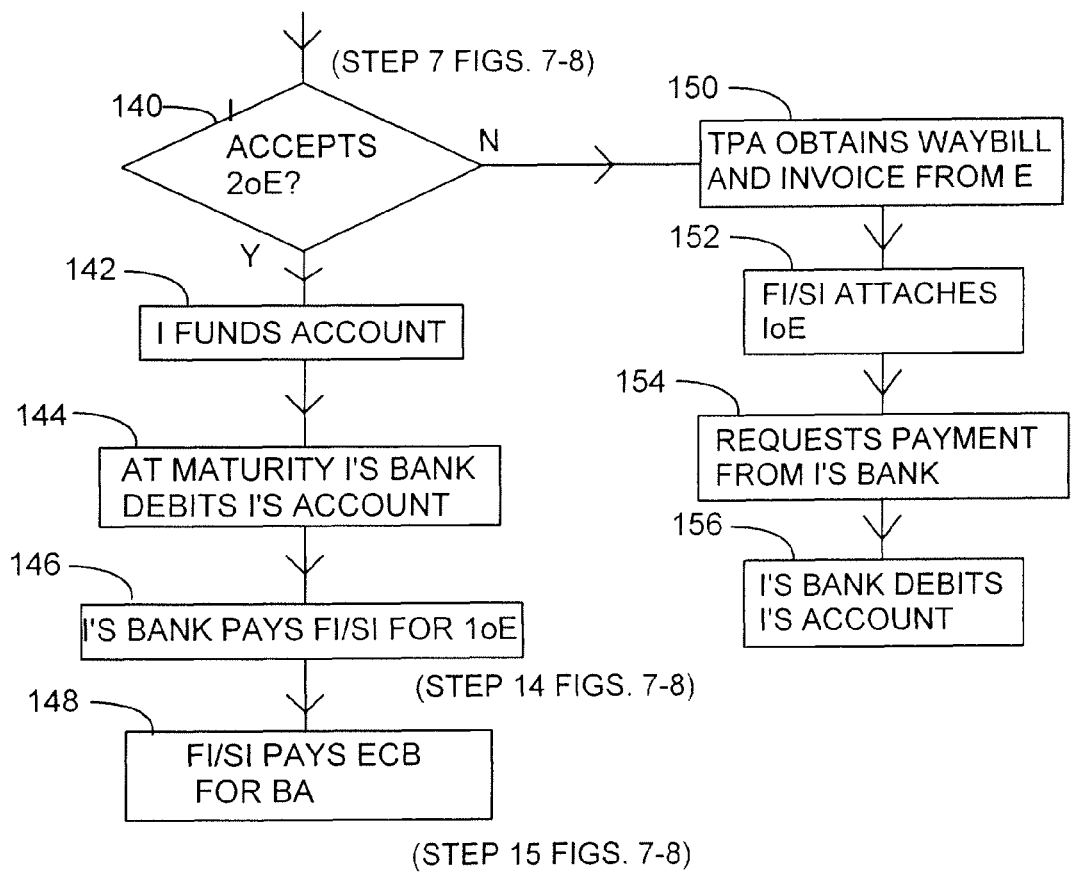
Figure 16:
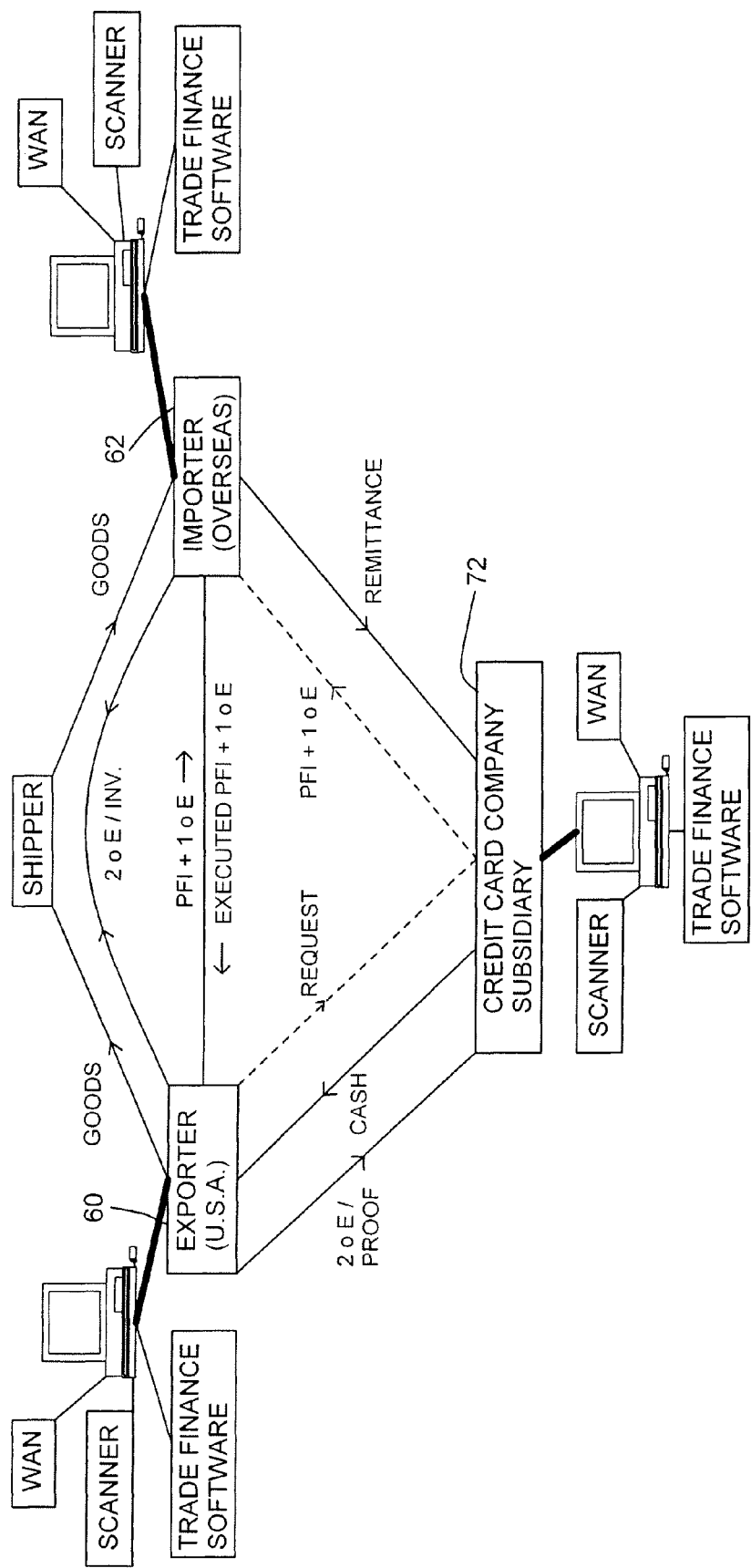
FIG. 16 is a schematic block diagram of another embodiment of cooperative computerized systems pursuant to the invention implemented to execute an export trade transaction and employing a credit card company subsidiary.

Referring now to FIG. 13, the method shown illustrates, by way of example, the role that can be played by a third party administrator TPA to facilitate financing of a single transaction import-export transaction between an exporter E, being a client of third party administrator TPA, and an importer I in another country or region. The method is well adapted for managing or administering numerous transactions between a client base of exporters and multifarious importers around the world. Preferably the method is computer-implemented, to the extent described above with reference to FIG. 12, and employs document imaging workflow management software, at least in the office of the third party administrator TPA and preferably also at the office of exporter E. Preferably also, third party administrator TPA assumes a lead role in document preparation and generation, although in some cases, more skilled exporters E may also create, generate, or issue some or all of the documents pursuant to the invention, preferably employing a module of the workflow management software. Employing such cooperative software modules, that facilitate communication of documents between the parties and permit easy markups and edits to be exchanged, third party administrator TPA and exporter E can work together as a team to complete the paperwork and effect the financing method of the invention in an efficient manner. It will be understood that many of the steps described hereinbelow as being performed by one of the parties could in fact be performed, in whole or in part, by the other, preferably employing a trade finance management software module according to the invention. In general, it may be expected that third party administrator TPA will assume a major role in document preparation for smaller or less experienced exportersl, while larger or more experienced exporters, especially after gaining experience and familiarity with the methods, instruments and systems of the invention, may prefer to prepare their own documents with minimal assistance from third party administrator TPA.

The method commences, in step 80, with exporter E furnishing to third party administrator TPA, transaction information regarding an import-export transaction which has been agreed with an importer I for the purchase from exporter E of a traded product, for example a shipment of manufactured goods. The transaction information includes the identity of the importer, the value of the transaction and further detailed information regarding the product to be shipped, the timing and any other relevant factors, as appropriate or desired.

In step 82 third party administrator TPA obtains or creates a unique identification number for exporter E, for example a DUNS number, as referenced above, tax identification, company registration, or other number. Where no such number is available, third party administrator TPA can help exporter E apply for a new number, step 84, and may make the request to an issuer of such identification numbers, for example to Dun & Bradtreet on behalf of the exporter, providing a service to exporter E in this respect, while at the same time compiling an accurate profile record of exporter E on third party administrator TPA's files. Where multiple numbers are available from the number issuer for a given exporter, third party administrator TPA can select one, optionally with the assistance of exporter, E. If desired, third party administrator TPA can additionally, or alternatively, issue its own identifier for the exporter, after appropriate verification of essential particulars.

After exporter E has been properly identified, in step 86 an identification number is preferably also obtained for importer I using a similar procedure and, if necessary, applying for a new number for importer I, step 87. Where importer I is relatively small, yet creditworthy, or in a relatively small or less developed country, a useful identification number may not be sufficiently readily available from an outside organization, in which case third party administrator TPA can create its own identifier to good effect.

Clearly, where third party administrator TPA already has a computer record for exporter E, from a prior transaction or importer I, or elsewhere, that data may be accessed, avoiding the need for step 82 or step 86, or both. However, care should be taken to update the information for changes of physical or communications addresses or the like. One way of effecting such updates is by automated online access to a source database of such information, preferably, when the record is requested.

Coordinating unique identification of both exporter E and importer I enables third party administrator TPA to identify legal as well as operational locations and to obtain enhanced control over an import-export transaction avoiding errors attributable to mistaken identities or locations, and with proper verification of the input data and taking advantage of the consistency of computer processing, data inconsistencies that may inconvenience, or seriously disrupt completion of a trade, can be avoided or reduced. Similarly, the quality of the documents created or issued by, or to, third party administrator TPA, for example the first of exchange, second of exchange and the pro-form a invoice, is enhanced by careful verification of the source data. With time, third party administrator TPA can build a valuable database capable of greatly enhancing import-export trade transactions by efficiently and reliably generating high quality documents.

Having established identifiers for exporter E and importer I, third party administrator TPA, now requests credit approval on importer I for the transaction, from an export credit bank, credit agency or other institution, step 88. In the event of no approval, the importer can be requested to finance the transaction with an advance commitment, for example, with a letter of credit, or cash before delivery or the like, step 89. In such case tba, can either withdraw from the process, or alternatively, and preferably, can employ their knowledge gained regarding the transaction to facilitate preparation and processing of the letter of credit or other payment document and provide an administration and monitoring role regarding same.

In step 90, third party administrator TPA notifies exporter E of the information gathered regarding importer I, and of the approval or otherwise of importer I's credit. If desired, importer I's complete file particulars can be forwarded to exporter E. Alternatively exporter E seek credit approval on importer I, after receiving this data, and advise third party administrator TPA of the outcome.

In step 92, third party administrator TPA, in anticipation of obtaining from importer I a trade acceptance by way of payment for the goods to be imported, seeks pre-approval from financial institution FI/SI of the prospective later conversion of a trade draft accepted by importer I to a banker's acceptance. Preferably, for quality of the instrument, FI/SI is a bank with at least an A rating with Standard & Poor's, Moody's or an equivalent rating agency. Whether or not FI/SI pre-approves importer I's trade acceptance for conversion, in connection with the contemplated transaction, determines the choice of processing subsequently in the method. If required by financial institution FI/SI, the request for pre-approval of draft conversion can be a written application executed by exporter E, or less probably by third party administrator TPA on behalf of exporter E. The draft conversion request can recite a specific amount for the anticipated value of a particular trade, or it may recite a credit line amount which can be drawn down in a series of trades between importer I and exporter E, or possibly, between importer I and a number of exporters, and replenished for further use, as payments from importer I reach financial institution FI/SI. Preferably, financial institution FI/SI issues a signed approval which is held by third party administrator TPA or, optionally, passed to exporter E.

In step 94, being notified that importer I is at least minimally creditworthy, exporter E offers importer I a selection of payment choices. The choices preferably include options to proceed with conventional financing, for example factoring or forfaiting, with a trade draft accepted by importer I, or to proceeed simply by paying in advance, before shipment of the goods, and more preferably include one or more options for adopting the financing method of the invention, employing a pre-release trade draft accepted by importer I prior to release of goods by exporter E. In this latter preferred embodiment, employing the pre-release trade draft process, reference will be made to implementation with a first of exchange, a second of exchange and a pro-form a invoice, as described herein, it being understood that variations and alternatives to these instruments are possible, some of which are also described herein.

If importer I prefers and selects other conventional financing methods, step 95, such conventional or quasi-conventional methods may optionally be effected with the assistance of third party administrator TPA, employing data and know-how regarding the transaction and the parties thereto, that have already been acquired and that are therefore available to third party administrator TPA for preparation of documents, queries and so on.

In the embodiment shown, when importer I selects a trade acceptance payment method they have the further option of choosing to employ the pre-release method of the invention, step 96. If importer I declines the pre-release method, optional step 98 can be taken to enhance I's credit, for example with a standby letter of credit or an aval, and other processing steps can then be taken to finance or obtain advance payment for the transaction, step 100, for example, forfaiting, an alternative guarantor method, or reverting to a letter of credit. Once again, such other processing steps 100 can also be effected with the assistance of third party administrator TPA.

In step 102, third party administrator TPA issues a pre-release trade draft which when signed and accepted by importer I, will become a trade acceptance TA. Preferably the draft is a latent bill of exchange having a term initiated by a specific future triggering event which, by way of example, can be the date of release by exporter E, to a shipper, of the goods constituting the traded product. The latent draft is dormant until activated by that release of goods, whereupon its term, e.g. 60 days begins to run. The tenor of the draft is thus 60 days from release of the goods. Pursuant to the inventive financing method, it is preferred that the bill of exchange be a first of exchange, 1oE, mutually extinguishable with a second of exchange, 2oE.

In step 104 exporter E prepares a pro forma invoice PFI containing agreements to pay with payment drafts and to remove the right of recourse from the payment cycle, as described herein. Exporter E sends the pro forma invoice along with the 1oE received from third party administrator TPA to importer I with a request for the documents to be signed indicating acceptance of their terms and conditions, and returned to exporter E. depending upon the urgency of the transaction, the documents can be forwarded from exporter E to importer I by courier, mail or fax. Where importer I is Internet-enabled, the documents can be transmitted as electronic files, for example as email attachments, if desired or by pulling the file as a download from a web site maintained by the exporter, or third party administrator TPA, to the importer. Alternatively, importer I can be emailed to retrieve the file by FTP download from the exporter or third party administrator TPA web site.

In step 106 "Y" if importer I signs the 1oE and pro forma invoice PFI, indicating acceptance of the terms of both documents, and returns them to exporter E, then exporter E sends the signed 1oE to third party administrator TPA, retaining the executed pro-forma invoice, step 108. If importer I declines to sign and return the 1oE and pro-forma invoice, step 106, "N" option, then other processing steps can be taken to finance or obtain advance payment for the transaction, step 110, preferably with the assistance of third party administrator TPA.

Third party administrator TPA holds the 1oE, step 112, until notified of the triggering event, the release of goods, by exporter E.

In due course, when the goods are ready, or at a time agreed with importer I, exporter E releases the goods to a shipper for delivery to importer I, and notifies third party administrator TPA of the release, and will preferably provide third party administrator TPA with a unique identifier code created by the carrier to evidence shipment, or with copies of the shipping documents, which may optionally embody the code, step 114. Such copies may be transmitted electronically, if the parties desire, after scanning, if necessary. At the time of shipment, exporter E prepares an invoice and second of exchange, 2oE, step 116. Assuming that by now exporter E knows the date on which the goods will be released to the shipper, which is the event date triggering the 1oE, then an actual future date certain can be entered on the 2oE for the term thereof, which date will be the maturity date of the 1oE calculated by adding its stated term to the date of the triggering event.

In step 118, exporter E sends the invoice and 2oE to importer I's bank with a request for I's bank to obtain acceptance of the 2oE by importer I against release of the invoice. As of spring 1999 it is to be expected that original hard copy paper documents will be required by importer I and their bank so that the invoice and 2oE will be forwarded by courier, or mail, depending upon time constraints, the value of the shipment and and whether it is being carried by sea or air. When regulations and practice permit these documents may be forwarded by fax, Internet or other network. Preferably, exporter E also copies the 2oE and the invoice to third party administrator TPA, which step may be effected electronically, if desired.

In step 120 third party administrator TPA applies the results of the request for FI/SI approval of the draft conversion process in step 92. If pre-approval has been received, option 120 "Y", third party administrator TPA initiates the draft conversion process, step 122, and notifies FI/SI that an accepted draft for conversion has been received, the 1oE, and that the banker's acceptance will be requested as soon as the triggering event occurs to activate the draft.

If FI/SI has declined to approve the conversion, step 120 "N", the method proceeds via other processing with third party administrator TPA, step 110. At this point, third party administrator TPA holds a trade acceptance on importer I with a future maturity date according to the stated term of the 1oE from the data of release of goods to the shipper. The 1oE may be returned to exporter E or held by third party administrator TPA as collateral pending acceptance of the 2oE by importer I. Depending on its quality, which will be largely determined by the reputation of importer I, the 1oE may or may not be discountable on the open market. At maturity, the holder, who may be exporter E, third party administrator TPA or another party, collects payment of either the 1oE or 2oE, of the from importer I's bank rather than FI/SI.

In step 124 third party administrator TPA verifies the accuracy of the shipment information provided. Inconsistencies can be referred back to exporter E for clarification or correction. Optionally, and if the shipping documents are in order, third party administrator TPA can, in step 128, buy insurance on a 1oE from a credit insurance carrier 130. While third party administrator TPA can be reimbursed in various ways for their fees and expenses, one convenient way is for the cost of credit insurance and the like to be deducted from the proceeds of the 1oE/2oE before they are paid to exporter E.

In step 132 third party administrator TPA makes available in actual or visual form the 1oE to financial institution FI/SI with verification or proof of shipment, or verification or proof of release of goods for shipment, and requests that FI/SI issue the pre-approved bankers acceptance and substitute same for the 1oE, Because this draft conversion process has been pre-approved in steps 62 and 120 "Y", it will usually proceed automatically, provided that the papers are in order. Therefore, in step 134, FI/SI prepares the banker's acceptance and sends it to the exporter's designated bank, for example, an export credit bank ECB. The banker's acceptance will usually be for the face amount of the invoice, less applicable payment discounts, and will have a term expiring no earlier than the maturity date of the 1oE and 2oE and possibly expiring up to about 30 days later. This additional time allows for collection of payment from importer I by his bank and transmission of the payment through the banking system.

In step 136 export credit bank ECB pays the exporter the invoiced value of the goods less fees and commissions. In step 138, promptly after sending the banker's acceptance to export credit bank ECB, FI/SI contacts importer I's bank to arrange payment of the 1oE. Export credit bank ECB can hold the banker's acceptance to maturity, or sell it at a discount to a holder in due course.

If importer I accepts the 2oE, as expected, step 140 "Y", then at the maturity date of the draft, the 2oE, I funds his account at his bank, step 142. On the maturity date I's bank debits I's account for the amount of the 2oE. The maturity date may, for example, be 60 days after the triggering event, the release of goods in step 114. In due course, perhaps as much as another 30 days, I's bank pays financial institution FI/SI for the 1oE, step 146, and, upon presentation at its maturity, financial institution FI/SI pays export control bank ECB for the banker's acceptance.

If importer I declines to accept the 2oE, step 140 "N", then third party administrator TPA obtains the waybill and invoice from exporter E and forwards same to financial institution FI/SI, step 150. Financial institution FI/SI attaches the original executed 1oE, step 152, and sends the documents to I's bank, requesting payment of the now-matured 1oE, step 154. The waybill and invoice evidence release of the goods in step 114 and thus, the activity of the draft. If the documents are in order, I's bank debits I's account and pays FI/SI for the 1oE.

In a modified embodiment of the system and process described with reference to FIG. 10, the functions of exporter's bank 66 and AA bank 68 are performed by an international credit card company, for example MasterCard Visa or American Express, (all of which are trademarks). The institutions supporting such credit card services are well placed to participate effectively in the trade financing methods of the invention by virtue of their worldwide credit databases providing credit information on a large number of individuals and businesses in many different countries and their capability readily to process international transactions. Some modification of their existing business practices, and possibly, development of new services may be desirable, given that conventional credit card transactions are for relatively small amounts at relatively high interest rates as compared with the requirements of import-export financing. Import-export finance services, participating in the practice of the methods of the present invention, could be offered by a new division, a subsidiary, or joint venture of a credit card company specifically catering to trade finance needs and providing financing for preferred customers for limited periods suitable to trade finance at significantly lower interest rates than the customary rather high conventional credit card rates. Such a credit card company subsidiary or division could take over many or all of the functions of TBA 64. Probably different office or agents of the credit card company, but operating under its aegis or license may handle different aspects of the transaction, exporter relationship, importer relationship, currency exchange, and so on. Use of a credit card company in this way provides an elegant solution to the problem of financing a transaction across national borders. The simplification of paperwork and other advantages of the trade financing methods, instruments and systems of the invention can help bring import-export financing withing reach of an international credit card issuing company.

Such a modified embodiment of the invention is illustrated in FIG. 11 where credit card company subsidiary 72 is shown as providing exporter 60 a cash remittance in exchange for the 2oE and proof of release of goods and receives a remittance from importer 62. Optionally, the credit card company subsidiary can process the pro forma invoice and first of exchange in response to exporter 60's request. No process of substitution of the trade acceptance for a banker's acceptance is necessary as the credit card company's subsidiary is able to rely upon the parent credit card company's own verification of the credit status of importer 62 and, in all probability a trustworthy credit history, failing which the credit card company would not have authorized the transaction in the first place.

Figure 17:
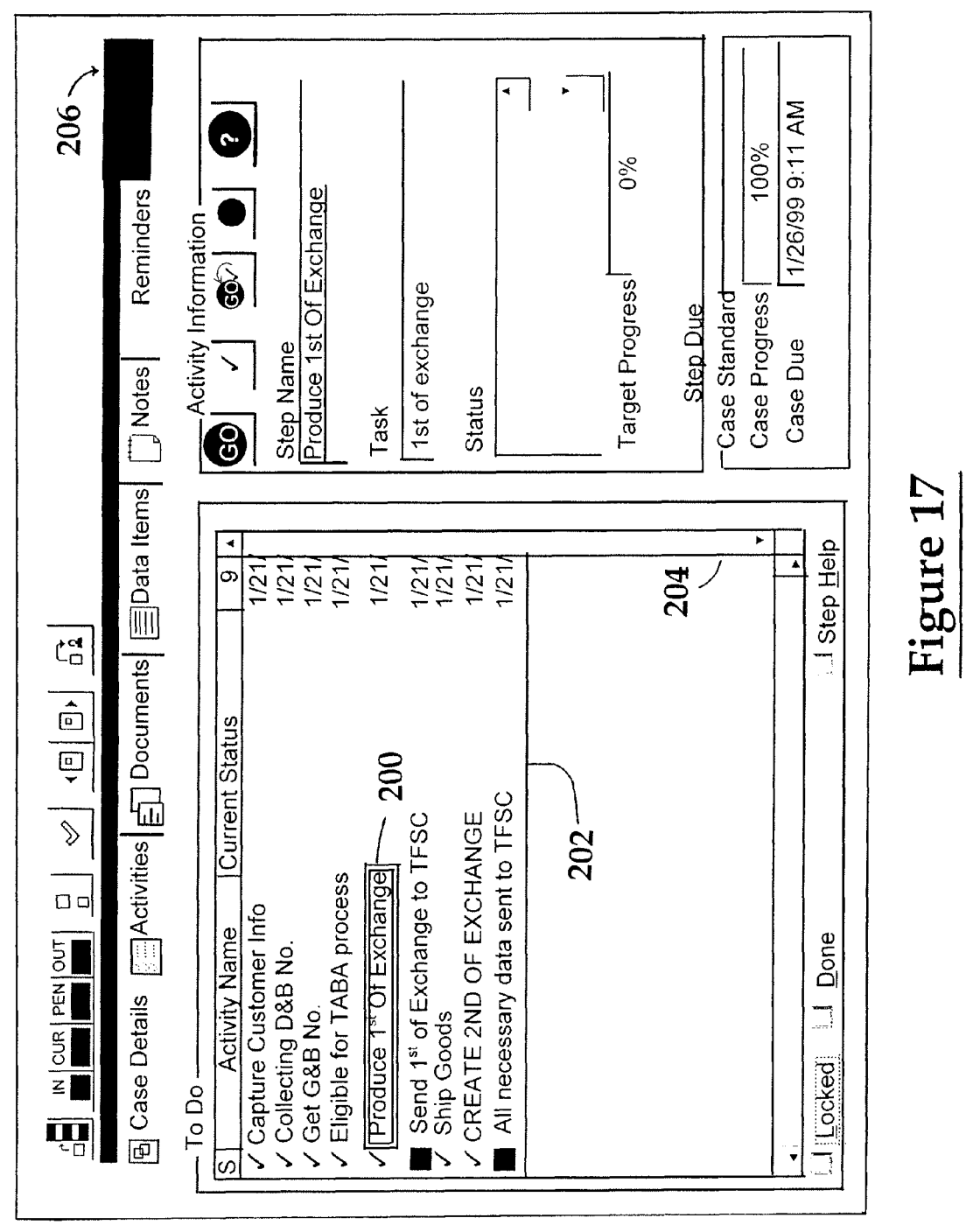

The computer screen illustrated in FIG. 17 is illustrative of many possible ways of computerizing a procedure for practicing the method of the invention. Many other ways will be apparent to those skilled in the art. The screen shown illustrates a module or procedure of a document image work flow management system suitable for use at the office of an exporter. Other modules for other participants can reflect activities appropriate for such other participant. Referring to FIG. 17, a user has highlighted an activity 200 "Produce first of Exchange" to select that activity from an activity list 202 on the left-hand side of the screen. Acitivty list 202 lists various process steps, some examples of which may be read from the figure, of one embodiment of the inventive method, which steps may be effected, facilitated or observed by the third party administrator TPA. An activity information window 204 on the right hand side of the screen displays available information regarding the activity "Produce first of Exchange" and permits editing and data entry, as required. Other activities shown in activity list 202 may be similarly processed. A horizontal menu bar 206 across the top of the screen provides access to other processing capabilities, as may be understood by reading the figure. Of note is "documents" button 208 which provides access to scanned images of the documents employed in the financing process.

Internet Implementation.

The methods and instruments of this invention are well suited to take advantage of the Internet's ubiquity, communications efficiency, constant desktop avialability and ease of use, to facilitate the conduct and growth in number of import-export trade transactions. Thus, operating through one or more web sites, a third party administrator can expedite individual trade transactions, permit any authorized party anywhere with Internet access to track progress of one or more import-export trade transactions, serve as a focus to catalyze the making of new trades by bringing together importers, exporters, finance providers, insurers, shippers, expediters, and any other party to an import-export transaction.

Employing customary ISP client access or operating through their own web sites, parties to a trade transaction, for example the exporter or importer, can utilize the methods, instruments or software or other implementing systems of the invention to conduct many of these functions on their own behalf. It is envisaged, however, that a skilled third party administrator TPA will, in time, with the experience of a diversity of trade transactions, build a reservoir of data, knowhow and contacts that can be communicated and administered via the Internet, or other suitable communications medium, to the benefit of many exporters, importers and other traders, regardless of their size and experience.

Thus the novel financing instruments described herein can be communicated via fax or via the Internet, according to the needs and preferences of the parties, with the expectation that more sophisticated exporters and importers. The herein described document adaptations, pursuant to the invention, permitting single-sided scanning of executed and endorsed documents are of particular value in enabling consummation of trade financing transactions via the Internet. Several options are available for Internet transmission of editable or signable documents.

INDUSTRIAL APPLICABILITY

The present invention is particularly suitable for application in importing and exporting industries providing advantageous financing of international trade transactions. Many of the invention process steps can be implemented in software running on a computer system, providing a special-purpose machine for managing trade financing. To meet present-day legal and jurisdictional requirements for bills of exchange to be embodied as paper documents, electronic systems for implementing the methods and instruments of the invention preferably include capabilities for scanning, indexing, storing, retrieving and outputting a combination of electronic images and electronic data.

In addition to goods and services, for example manufactured goods and commercially delivered services such as insurance, carriage, construction, financial professional and consulting services, it will be understood that the traded product may comprise other artifacts of man such as fixed structures or buildings, commercial and industrial buildings and facilities, land, artworks or any other product that may be bought and sold. Although, not so restricted, the invention is particularly useful where the buyer and seller are physically separated from one another at one or more relevant times in the transaction process, and especially where the traded product is carried, performed, or otherwise delivered to the buyer by another party than the seller. In the case, for example, of the sale of a house, will be understood that although the buyer and seller may be together at the house itself, the movies separated at other times the course of the transaction and can benefit from the invention. Thus, the invention is generally applicable to any transaction of adequate value, where the ability to provide time for the buyer to pay while protecting the seller from risk is helpful.

While illustrative embodiments of the invention have been described above, it is, of course, understood that various modifications will be apparent to those of ordinary skill in the art. Many such modifications are contemplated as being within the spirit and scope of the invention.

The invention claimed is:

1. A method of effecting payment in a commercial transaction wherein a product is traded from a seller to a buyer, the method comprising generating a bill of exchange by a computer, the bill of exchange being issued by the seller, being accepted by the buyer, being payable to the order of the seller at a first financial institution at a certain future date related to a triggering event recited in the bill of exchange, being drawn on the buyer at a second financial institution, and becoming a negotiable instrument that is negotiable without reference to the commercial transaction upon occurrence of the triggering event, and wherein the method comprises:
    (a) originating the bill of exchange from an originator, by the computer, the originator being a party which is not the seller;
    (b) signing of the bill of exchange by the buyer prior to issuance of the bill of exchange;
    (c) signing of the bill of exchange by the seller after the bill of exchange has been signed by the buyer;
    (d) issuing of the bill of exchange by the seller, by the computer, after the seller and the buyer have signed the bill of exchange; and
    (e) negotiating the bill of exchange, by the computer, after issuance and on or after occurrence of the triggering event, to effect payment for the traded product;
wherein the bill of exchange comprises mutually extinguishable first and second bills of exchange, wherein a subsequent financial institution originates a sole bill of exchange based on the collateral provided by the first bill of exchange before the triggering event and accepts the sole bill of exchange prior to signing of the mutually extinguishable first and second bills of exchange by the seller, wherein the sole bill of exchange is drawn upon the subsequent financial institution in exchange for payment from the buyer under either the first bill of exchange, the second bill of exchange being unpaid, or the second bill of exchange, the first bill of exchange being unpaid.

2. A method according to claim 1 wherein the method further comprises the buyer providing, by the computer, a purchase order reciting terms of the commercial transaction and controlling the terms of the purchase order.

3. A method according to claim 2 wherein the buyer comprises the originator.

4. A method according to claim 3 wherein the buyer comprises an importer and the seller comprises an exporter.

5. A method according to claim 2 wherein the purchase order is combined with the bill of exchange on a single sheet of paper or in an electronic image or equivalent of a single sheet of paper.

6. A method according to claim 1, wherein the commercial transaction comprises transportation of the traded product from a shipping party to a receiving party wherein the bill of exchange is originated by a transportation intermediary for acceptance by the receiving party, prior to issuance of the bill of exchange by the shipping party, wherein the shipping party provides said transportation of the traded product.

7. A method according to claim 1, wherein the originator of the bill of exchange is a financial intermediary and the method comprises the financial intermediary providing, by computer, the bill of exchange for signing to the buyer together with documents identifying the commercial transaction prior to issuance of the bill of exchange.

8. A method according to claim 1 wherein the commercial transaction includes an agreement between the buyer and the seller that variances can be made to the commercial transaction by the buyer and the seller changing at least one document defining the transaction and by the changed at least one document being agreed by the buyer and seller re-initiating the transaction.

9. A method according to claim 8 wherein the changed at least one document is agreed to by the buyer and seller by a communications protocol comprising one or more communications protocols selected from the group consisting of fax, email, email attachments and online communication.

10. A method according to claim 1 comprising credit enhancing the accepted bill of exchange, by employing a credit enhancement selected from the group consisting of an aval, a guarantee, a letter of credit, collateralization, substitution of a banker's acceptance for the bill of exchange after acceptance by the buyer and combinations of two or more of the foregoing credit enhancements, and by indicating the credit enhancement on or with the bill of exchange.

11. A method according to claim 1 comprising employing a transaction window on the bill of exchange, the transaction window containing one or more document identifiers to identify documents employed in the commercial transaction, wherein the one or more documents identified comprise at least the contract defining the commercial transaction.

12. A method according to claim 11 wherein the transaction window contains multiple document identifiers, the method comprising employing the document identifiers to monitor and index the flow of documents relative to the commercial transaction by computer for information purposes.

13. A method according to claim 1 wherein the originator comprises the buyer, the first financial institution, the second financial institution, another financial institution, a financial intermediary or a transportation intermediary.

14. A method according to claim 1 wherein the traded product comprises one or more products selected from the group consisting of goods, manufactured goods, services, commercially delivered services, insurance, carriage, construction, financial services, professional services, consulting services, artifacts, fixed structures, buildings, commercial buildings, industrial buildings, industrial facilities, land and artworks.

15. A method according to claim 1
    wherein the originator obtains the signature of the buyer to the bill of exchange prior to issuance of the bill of exchange;
    wherein the originator obtains the signature of the seller, as issuer, to the bill of exchange after the bill of exchange has been signed by the buyer; and
    wherein the originator negotiates the bill of exchange after issuance and on or after the occurrence of the triggering event to effect payment for the traded product.

16. A method according to claim 1 wherein the triggering event is selected from the group of events consisting of release of the traded product by the seller, delivery of the traded product to the buyer, availability of specified funds to the buyer, availability of the proceeds of an asset sale to the buyer, and, in the case of a manufactured traded product, progress of manufacture of the traded product to an agreed stage of manufacture, the certain future date, performance of a service and delivery of a service.

17. A method of effecting payment in a commercial transaction wherein a product is traded from a seller to a buyer, the method comprising generating a bill of exchange by a computer, the bill of exchange being issued by the seller, being accepted by the buyer, being payable to the order of the seller at a first financial institution at a certain future date related to a triggering event recited in the bill of exchange, being drawn on the buyer at a second financial institution, and becoming a negotiable instrument that is negotiable without reference to the commercial transaction upon occurrence of the triggering event, and wherein the method comprises:

(a) originating the bill of exchange from an originator, by the computer, the originator being a party which is not the seller;

(b) signing of the bill of exchange by the buyer prior to issuance of the bill of exchange;

(c) signing of the bill of exchange by the seller after the bill of exchange has been signed by the buyer;

(d) issuing of the bill of exchange by the seller, by the computer, after the seller and the buyer have signed the bill of exchange; and (e) negotiating the bill of exchange, by computer, after issuance and on or after occurrence of the triggering event, to effect payment for the traded product wherein the certain future date is specified in the bill of exchange as being at the end of a term commencing with the occurrence of the specified triggering event, and wherein the bill of exchange is issued and accepted before the specified triggering event, the method comprising calculating the term of the bill of exchange from the triggering event by computer and negotiating the bill of exchange by computer without further reference to the status of the commercial transaction.

* * * * *